(12) United States Patent
Bulthuis et al.

(10) Patent No.: US 8,873,910 B2
(45) Date of Patent: Oct. 28, 2014

(54) OPTICAL DEVICE WITH ATHERMAL SLOTS FOR TEMPERATURE DEPENDENCE CURVATURE REDUCTION

(75) Inventors: Hindrik Freerk Bulthuis, Apeldoorn (NL); Paula McDade, Glasgow (GB); Gunter B. Beelen, Zoutleeuw (BE)

(73) Assignee: Gemfire Corporation, Newark, CA (US)

( * ) Notice: Subject to any disclaimer, the term of this patent is extended or adjusted under 35 U.S.C. 154(b) by 684 days.

(21) Appl. No.: 13/051,900

(22) Filed: Mar. 18, 2011

(65) Prior Publication Data

US 2011/0229080 A1    Sep. 22, 2011

Related U.S. Application Data

(60) Provisional application No. 61/315,824, filed on Mar. 19, 2010.

(51) Int. Cl.
| | | |
|---|---|---|
| *G02B 6/34* | (2006.01) | |
| *G02B 6/26* | (2006.01) | |
| *G02B 6/10* | (2006.01) | |
| *G02B 6/12* | (2006.01) | |

(52) U.S. Cl.
CPC ........ *G02B 6/12011* (2013.01); *G02B 6/12028* (2013.01)
USPC ............................... 385/37; 385/27; 385/132

(58) Field of Classification Search
CPC ........... G02B 6/12011; G02B 6/12019; G02B 6/12009; H01S 5/0268
USPC ................... 385/27, 37, 46, 50, 129–132, 39; 427/163.2
See application file for complete search history.

(56) References Cited

U.S. PATENT DOCUMENTS

| | | | |
|---|---|---|---|
| 5,002,350 | A | 3/1991 | Dragone |
| 5,629,992 | A | 5/1997 | Amersfoort et al. |
| 5,732,171 | A | 3/1998 | Michel et al. |
| 5,799,118 | A | 8/1998 | Ogusu et al. |
| 5,937,113 | A | 8/1999 | He et al. |

(Continued)

FOREIGN PATENT DOCUMENTS

| | | |
|---|---|---|
| EP | 0907091 A2 | 4/1999 |
| EP | 0919840 A1 | 6/1999 |

(Continued)

OTHER PUBLICATIONS

EP 11711225.0—Examination Report dated Sep. 16, 2013, 6 pages.

(Continued)

*Primary Examiner* — Tina Wong
*Assistant Examiner* — Michael Mooney
(74) *Attorney, Agent, or Firm* — Haynes Beffel & Wolfeld LLP; Warren S. Wolfeld

(57) ABSTRACT

In one aspect of the invention, roughly stated, Applicants have discovered that a compensation material within slot elongated in a direction parallel to a segment of waveguide in an arrayed waveguide grating apparatus can compensate for both first and second order change in refractive index of the base waveguide material over temperature. Unlike the transverse slots of conventional linear athermalization techniques, the elongated slot generally parallel to the base material defines a composite waveguide section having a second order effective index of refraction temperature dependency which can be utilized to accurately minimize the temperature dependence of the overall optical path length to both the first and second order. The techniques described herein are also generalizeable to neutralization of the optical path length temperature dependence to any order.

30 Claims, 22 Drawing Sheets

(56) References Cited

U.S. PATENT DOCUMENTS

| | | |
|---|---|---|
| 5,978,539 A | 11/1999 | Davies et al. |
| 6,055,349 A | 4/2000 | Seino et al. |
| 6,118,909 A | 9/2000 | Chen et al. |
| 6,137,939 A | 10/2000 | Henry et al. |
| 6,169,838 B1 | 1/2001 | He et al. |
| 6,181,848 B1 | 1/2001 | Bruno et al. |
| 6,212,323 B1 | 4/2001 | Harpin et al. |
| 6,289,147 B1 | 9/2001 | Bulthuis et al. |
| 6,304,687 B1 | 10/2001 | Inoue et al. |
| 6,519,380 B2 | 2/2003 | Dawes et al. |
| 6,542,666 B2 | 4/2003 | Tsuda et al. |
| 6,574,409 B1 | 6/2003 | Moroni et al. |
| 6,757,454 B2 | 6/2004 | Inoue et al. |
| 6,768,842 B2 | 7/2004 | Bulthuis et al. |
| 6,925,231 B2 | 8/2005 | Lazaro Villa et al. |
| 6,985,656 B2 | 1/2006 | Iazikov et al. |
| 7,013,065 B2 | 3/2006 | Petermann et al. |
| 7,043,120 B2 | 5/2006 | Wada et al. |
| 7,177,499 B2 | 2/2007 | Johnson |
| 7,187,818 B2 | 3/2007 | Grobnic et al. |
| 7,194,162 B2 | 3/2007 | Yan et al. |
| 7,397,986 B2 | 7/2008 | Bulthuis et al. |
| 2003/0039008 A1 | 2/2003 | Davies |
| 2003/0039441 A1 | 2/2003 | Kashihara et al. |
| 2003/0123799 A1 | 7/2003 | Lazaro Villa |
| 2003/0156789 A1 | 8/2003 | Bhardwaj et al. |
| 2004/0170356 A1 | 9/2004 | Iazikov et al. |
| 2006/0078245 A1 | 4/2006 | Yoneda |
| 2008/0226232 A1 | 9/2008 | Bulthuis et al. |

FOREIGN PATENT DOCUMENTS

| | | |
|---|---|---|
| EP | 1089098 A1 | 4/2001 |
| GB | 2370128 A | 6/2002 |
| JP | 08334639 A | 12/1996 |
| JP | 09030251 A | 2/1997 |
| JP | 11160559 A | 6/1999 |
| JP | 200151138 A | 11/2002 |
| JP | 2002328243 A | 11/2002 |
| JP | 2002341163 A | 11/2002 |
| KR | 2000-0064922 | 11/2000 |
| KR | 2005-10076 A | 8/2006 |
| WO | 9723969 A1 | 7/1997 |
| WO | 9813718 A1 | 4/1998 |
| WO | 9921038 A1 | 4/1999 |
| WO | 0107944 A2 | 2/2001 |
| WO | 0107948 A1 | 2/2001 |
| WO | 0107949 A1 | 2/2001 |
| WO | 0107955 A1 | 2/2001 |
| WO | 0107956 A1 | 2/2001 |
| WO | 03025644 A1 | 3/2003 |
| WO | 2006/073229 A1 | 7/2006 |
| WO | 2009104664 A1 | 8/2009 |

OTHER PUBLICATIONS

K Maru, K. Matsui, H. Ishikawa, Y. Abe, S. Kashimura, S. Himi and H. Uetsuka, "Super-High-.DELTA. athermal arrayed waveguide grating withresin-filled trenches in slab region," Electronic Letters, vol. 40, No. 6, pp. 374-375, Mar. 18, 2004. cited by other.

K. Maru, M. Ohkawa, H. Nounen, S. Takasugi, S. Kashimura, H. Okano and H. Uetsuka, "Athermal and Center Wavelength Adjustable Arrayed-Waveguide Grating," Optical Fiber Communication Conference 2000, Baltimore, MD, vol. 2, pp. 130-132, Mar. 7-10, 2000. cited by other.

Smit, M. K., "Phasar-Based WDM-Devices: Principles, Design and Applications," IEEE Journal of Selected Topics in Quantum Electronics, vol. 2, No. 2, pp. 236-250, Jun. 1996. cited by other.

A. Kaneko, S. Kamei, Y. Inoue, H. Takahashi and A. Sugita, "Athermal silica-based arrayed-waveguide grating (AWG) multi/demultiplexers with new low loss groove design," IEEE 2000, Electronics Letters Online No. 20000261, Dec. 20, 1999. cited byother.

Wildermuth E. et al. "Penalty-free polarisation compensation of SiO2/Si arrayed waveguide grating wavelength multiplexers using stress release grooves," IEE Electronic Letters Online No. 19981186; IEE Electronic Letters vol. 34, No. 17IEE 34(17) 1998, 2pp.

Terui H. et al. "Reduction of Second-Order Temperature Dependence of Athermal AWG With Resin-Filled Groove by Pressure Control," IEEE Photonics Tech. Ltrs., vol. 21, No. 19 (2009) pp. 1426-1428.

Kamei S. et al., "Compensation for Second-Order Temperature Dependence in Athermal Arrayed-Waveguide Grating Realizing Wide Temperature Range Operation," IEEE Phototonics Tech. Ltrs., vol. 21, No. 22 (2009) pp. 1695-1697.

International Search Report mailed Jul. 7, 2011 in PCT/US2011/029069.

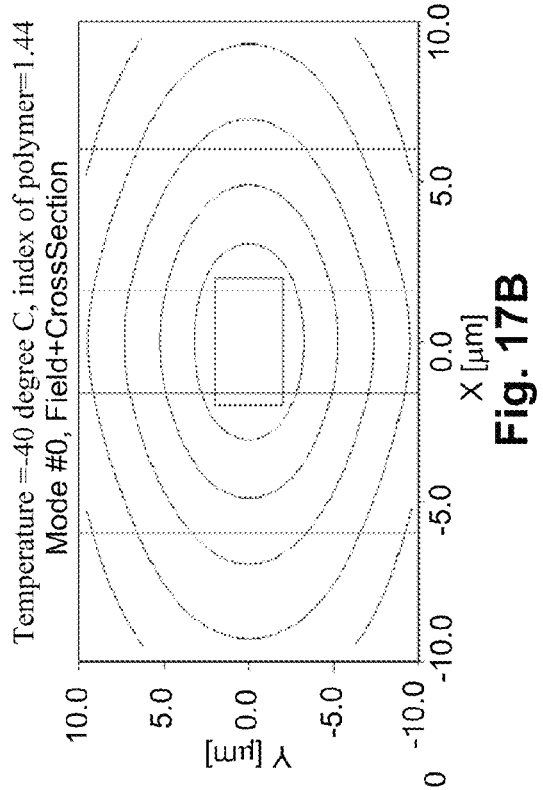
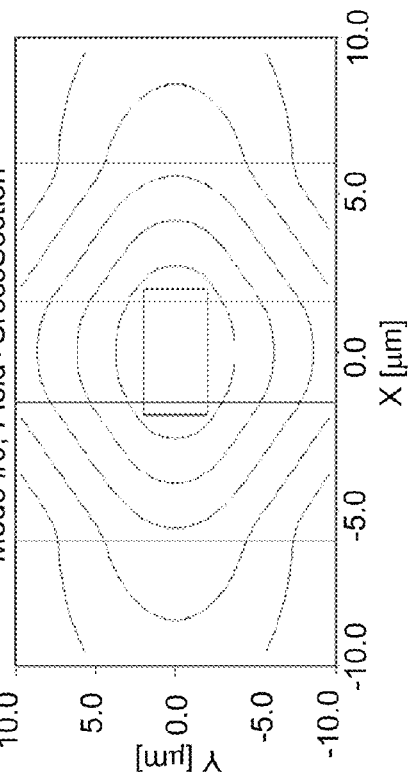
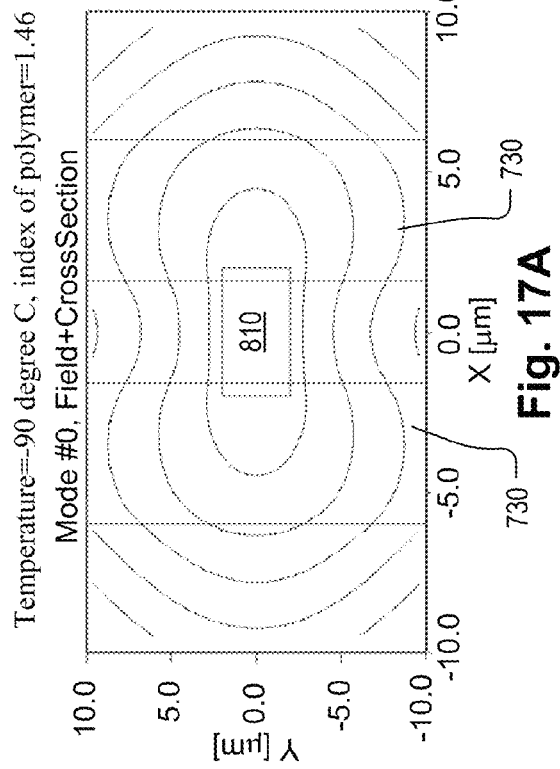
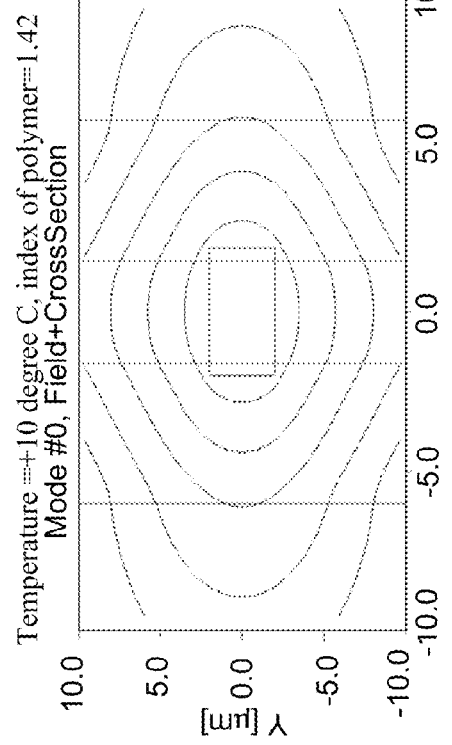

OPTICAL DEVICE WITH ATHERMAL SLOTS FOR TEMPERATURE DEPENDENCE CURVATURE REDUCTION

CROSS-REFERENCE TO RELATED APPLICATIONS

This application claims the benefit of U.S. Provisional Application No. 61/315,824 entitled "Optical Device with Athermal Slots for Temperature Dependence Curvature Reduction" filed 19 Mar. 2010, which is incorporated by reference herein.

BACKGROUND

1. Field of the Invention

The present invention relates generally to optical grating devices, and more particularly to techniques for athermalizing such devices.

2. Description of Related Art

Computer and communication systems place an ever-increasing demand upon communication link bandwidths. It is generally known that optical fibers offer a much higher bandwidth than conventional coaxial links. Further, a single optical channel in a fiber waveguide uses a small fraction of the available bandwidth of the fiber. In wavelength division multiplexed (WDM) optical communication systems, multiple optical wavelength carriers transmit independent communication channels at different wavelengths into one fiber. By transmitting several channels at different wavelengths into one fiber, the bandwidth capability of an optical fiber is efficiently utilized.

Fiber-optic multiplexing and demultiplexing have been accomplished using an arrayed waveguide grating (AWG) device. An AWG is a planar structure comprising an array of waveguides disposed between input and output couplers and arranged side-by-side with each other, and which together act like a diffraction grating in a spectrometer. Each of the waveguides differs in length with respect to its nearest neighbor by a predetermined fixed amount. The outputs of the output coupler form the outputs of the multiplexing and demultiplexing device. In operation, when a plurality of separate and distinct wavelengths are applied to separate and distinct input ports of the device, they are combined and are transmitted to an output port. The same device may also perform a demultiplexing function in which a plurality of input wavelengths on one input port of the apparatus, are separated from each other and directed to predetermined different ones of the output ports. AWGs can also perform a routing function, in which signals arrive on multiple input ports and are routed to multiple different output ports in accordance with a predefined mapping. The construction and operation of such AWGs is well known in the art. See for example, "PHASAR-based WDM-devices: Principles, Design and Applications", M K Smit, IEEE Journal of Selected Topics in Quantum Electronics Vol. 2, No. 2 Jun. 1996, and U.S. Pat. No. 5,002,350 and WO97/23969, all incorporated by reference.

Wavelength division multiplexers and demultiplexers require precise control of the effective optical path length difference between adjacent waveguides. The effective optical path length difference is defined as the product of the effective index of refraction of the fundamental mode in the waveguide and the physical path length difference between adjacent waveguides. The effective index of refraction of the fundamental mode in the waveguides and the physical path length differences between adjacent waveguides for currently available wavelength division multiplexers and demultiplexers are typically both temperature dependent. In conventional integrated optical multiplexer and demultiplexer devices, the medium forming the arrayed waveguides has a noticeable temperature dependency which results in changes in the central transmission wavelength which may exceed the transmission bandwidth. As a result, temperature variations that are within a specified device operating temperature range (e.g. from about 0 C to about 70 C) induce a wavelength shift which is unacceptable in comparison to the typical accuracy requirements. Consequently, available multiplexer/demultiplexer optical devices of the phased array type are generally operated in a temperature controlled environment. Typically, control circuits with heating elements are provided to maintain the device at a stable temperature higher than the maximum specified operating temperature. But the use of heating elements to achieve active athermalization is undesirable because it increases the overall cost, size and complexity of the device, reduces device lifetimes, and consumes considerable power. It also usually requires active smart control electronics and even then it may operate differently depending on the device's physical horizontal/vertical orientation. Peltier coolers can also be used, but these suffer from many of the same inadequacies.

In the case of conventional wavelength division multiplexers having a phased array optical grating comprising a plurality of silica core waveguides and silica cladding, the variation of channel wavelength as a function of temperature predominately depends on the positive variation of the effective index of refraction of the silica as a function of temperature. In an effort to compensate for the positive variation of refractive index as a function of temperature for silica-based materials, polymer overcladding materials having a negative variation of refractive index as a function of temperature have been employed. However, a problem with this arrangement is that as the temperature varies, the difference in refractive index between the core and the cladding varies, and in the worst case, light may not be able to be guided into the waveguide. As a result, optical multiplexer/demultiplexer devices having a phased array type grating with a polymer overcladding may not be suitable for use over a wide range of ambient temperatures.

Another proposed design for maintaining a relatively constant effective optical path length difference between adjacent waveguides in a phased array involves localizing a compensation material (typically a polymer) in a triangular or crescent-shaped groove or slot either in the phased array or in the slab region coupling the phased array with either the input or output fibers. The polymer-filled groove is transversely oriented across adjacent waveguides in a direction generally perpendicular to the direction of the optical paths. The physical length of the groove along the optical path of a given waveguide is a function of the physical path length, such that the optical paths of adjacent waveguides experience a constant physical path length increment through the groove. The polymer can be selected such that it has a negative variation in effective index of refraction as a function of temperature to compensate for the positive variation in the index of refraction of the silica waveguide core segments as a function of temperature, thereby inhibiting shifting of channel wavelengths due to variations in operating temperature within a predetermined operating temperature range. The polymer groove can be divided into more than one groove encountered by the optical energy sequentially, to reduce the length of free space propagation across each groove.

The use of polymer-filled grooves can improve athermalization substantially. In conventional polymer-filled groove athermalization methods, the change in the respective index of refraction of each of the silica based waveguide and the polymer compensation material, are both assumed to be linear with temperature. Any higher order effects typically are ignored. Typical AWGs that have been athermalized in this way can achieve a center channel wavelength drift as small as 0.03 to 0.05 nm over a typical operating temperature range of +5 to +70 C. However, that is still not good enough for many applications. Such drifts limit the applicability of the device to only that stated temperature range, and to only systems having channel spacings of about 100 GHz or higher, where this variation would be tolerable. They are not readily usable, for example, in an outdoor equipment enclosure in climates where freezing temperatures are possible, or in systems that require a broad passband and a channel spacing less than about 100 GHz.

Another major category of techniques that have been investigated for athermalization are mechanical in nature, such as techniques that include temperature-controlled actuators for actively positioning the components of the device relative to each other. These may include, for example, a bi-metallic actuator that adjusts the lateral position of the input waveguide relative to the input slab region in accordance with ambient temperature. These techniques are generally complex and expensive to make as the manufacturing tolerances are usually extremely tight.

Accordingly, it is desirable to provide arrayed waveguide grating devices that exhibit excellent athermalization over a wide temperature range, without requiring a temperature controlled environment, and without requiring the complexities and tight manufacturing tolerances of mechanical methods.

SUMMARY

In one aspect of the invention, roughly stated, Applicants have discovered that a compensation material within slot elongated in a direction parallel to a segment of waveguide in an arrayed waveguide grating apparatus can compensate for both first and second order change in refractive index of the base waveguide material over temperature. Unlike the transverse slots of conventional linear athermalization techniques, the elongated slot generally parallel to the base material defines a composite waveguide section having a second order effective index of refraction temperature dependency which can be utilized to accurately minimize the temperature dependence of the overall optical path length to both the first and second order. The techniques described herein are also generalizeable to neutralization of the optical path length temperature dependence to any order. As a result, the techniques described herein can compensate for the effective optical path length variation in the waveguide material with much better accuracy, or over a much wider temperature range of −30 C to +70 C for example, or both.

An arrayed waveguide apparatus as described herein includes a plurality of waveguides from an input free-space region to an output free-space region. Each waveguide in the plurality comprises a core material, a cladding material, and a compensation material within a slot elongated in a direction parallel to a segment of the core material. The compensation material has an effective index of refraction temperature dependency with differs from that of the core and cladding materials.

An arrayed waveguide apparatus as described herein includes a plurality of waveguides from an input free-space region to an output free-space region. Each waveguide in the plurality includes core and cladding materials which confine optical energy in at least one dimension orthogonal to a direction of propagation of the optical energy. Each waveguide further includes a composite waveguide section which maintains confinement of the optical energy in the at least one dimension. Each waveguide has a respective optical path length between an input boundary of the input free-space region and output boundary of the output free-space region which differs from that of an adjacent waveguide in the plurality by a respective effective optical path length difference. Each optical path may further include a section of transverse slots as in the conventional liner athermal AWG described before. At least the first and second order derivatives with respect to temperature for each of the optical path length differences are substantially equal to zero throughout a temperature range of −5 degrees Celsius to +70 degrees Celsius.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Other aspects and advantages of the present invention can be seen on review of the drawings, the detailed description, and the claims which follow.

BRIEF DESCRIPTION OF THE DRAWINGS

FIGS. 17A-17D illustrate an example of the change in the cross-sectional light distribution versus temperature for an exemplary composite waveguide section having a cross-section like that shown in FIG. 8.

DETAILED DESCRIPTION

The following description is presented to enable any person skilled in the art to make and use the invention, and is provided in the context of a particular application and its requirements. Various modifications to the disclosed embodiment will be readily apparent to those skilled in the art, and the general principles defined herein may be applied to other embodiments and applications without departing from the spirit and scope of the present invention. Thus, the present invention is not intended to be limited to the embodiments shown, but is to be accorded with the widest scope consistent with the principles and features disclosed herein.

Figure 1:
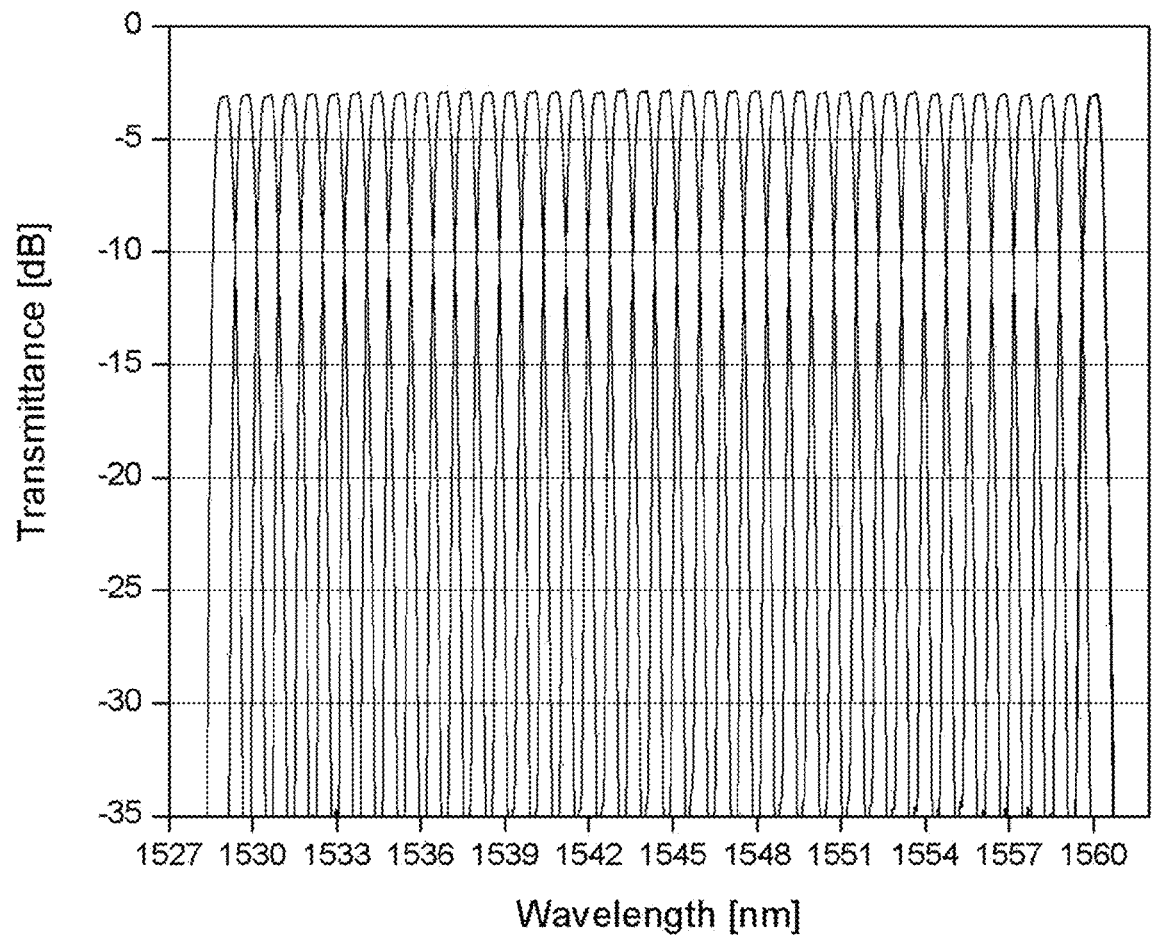
FIG. 1 illustrates the spectral response of a typical AWG acting as a wavelength division demultiplexer.

FIG. 1 illustrates the spectral response of a typical AWG acting as a wavelength division demultiplexer. The plot illustrates the transmittance observed at each of a plurality of different output channels, all superimposed onto a single plot. Alternatively, the plot illustrates the spectral response of a typical AWG acting as a wavelength division multiplexer, with the transmittance from each of a plurality of different input channels to a common output superimposed onto a single plot. Each transmittance curve has a main lobe that peaks at about −5 dB in this example, and has a center frequency $f_c$ that varies incrementally from channel to channel, with substantially equal spacing between the center frequencies of adjacent channels. The center frequencies need not be spaced equally in different AWG embodiments. The center wavelength $\lambda_c$ is related to the center frequency as $\lambda_c = c/f_c$, where c is the speed of light. The center wavelength $\lambda_c$ is defined herein as the average of the two wavelengths for which the transmittance is half the peak transmittance for average polarization state.

Figure 2:
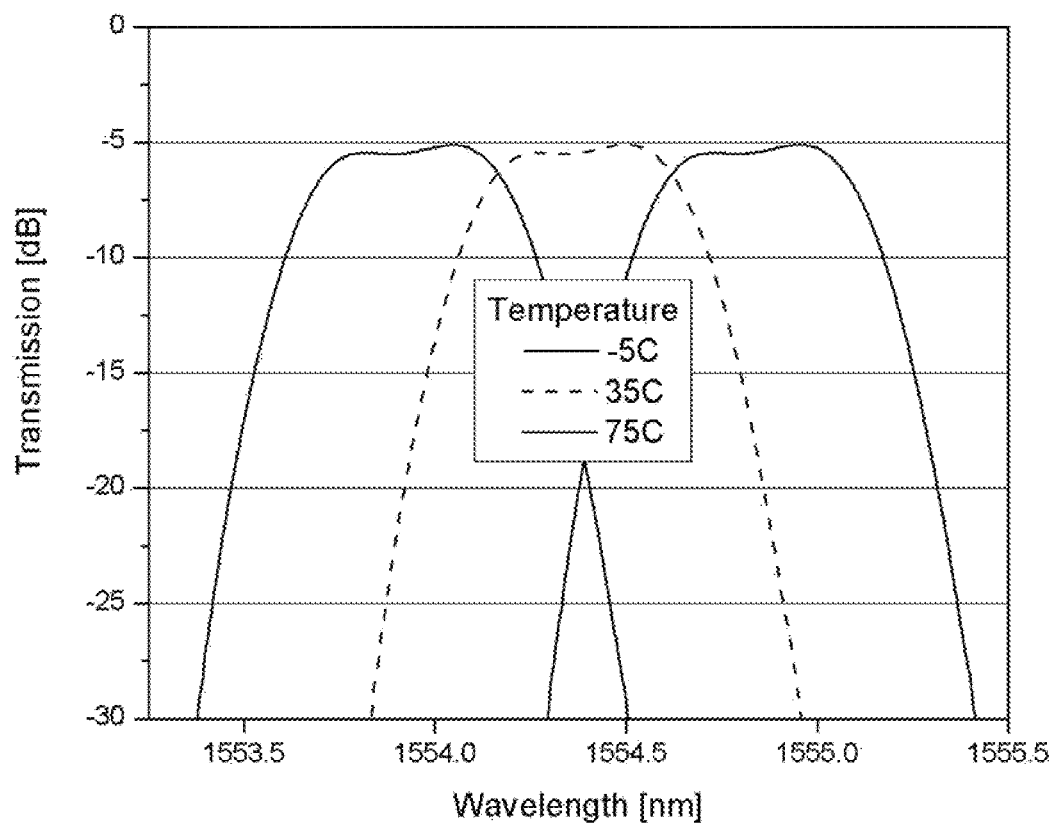
FIG. 2 is a plot showing the transmittance in a single channel of a conventional AWG, at ambient temperatures of −5 C, +35 C and +75 C.

FIG. 2 is a plot showing the transmittance in a single channel of a conventional AWG, at ambient temperatures of −5 C, +35 C and +75 C. It can be seen that the center wavelength increases as the temperature increases. The center wavelength variation with temperature is approximately the same for each channel, so analysis of the center wavelength variation for one channel for most AWG designs is representative of all channels in the design. For purposes of the present discussion, the central channel is used at both the input and output. This center wavelength shift with temperature is problematic in mux/demux applications because the wavelength of the incoming optical energy does not shift. By specification, the incoming optical energy for a given channel has the great majority of its power concentrated within the main lobe of the corresponding AWG passband, so as the passband shifts in wavelength, the channel loss can become substantial. It can be seen that losses may be acceptable above a predetermined channel wavelength spacing (permitting an AWG designed with wider passbands), but unacceptable for narrower channel spacings (requiring an AWG designed with narrow passbands). In filtering applications, a shift in the central wavelength of the passbands can cause the resulting signal to be out of specification and inappropriate for downstream components.

For an AWG, the center wavelength $\lambda_c$ is given by $$\lambda_c = \frac{n_{eff} \Delta L}{m} \qquad \text{(eq. 1)}$$

where $n_{eff}$ is the effective index of refraction in the waveguide, $\Delta L$ is the length increment between adjacent waveguides in the array, and m is the order of the grating. The temperature dependence of the center wavelength $\lambda_c$ arises because both $n_{eff}$ and $\Delta L$ vary with temperature, although the temperature dependence of $n_{eff}$ is typically much more significant. In fact as explained below, the temperature dependence of $\Delta L$ can be lumped into that of $n_{eff}$ without losing much accuracy.

Figure 3:
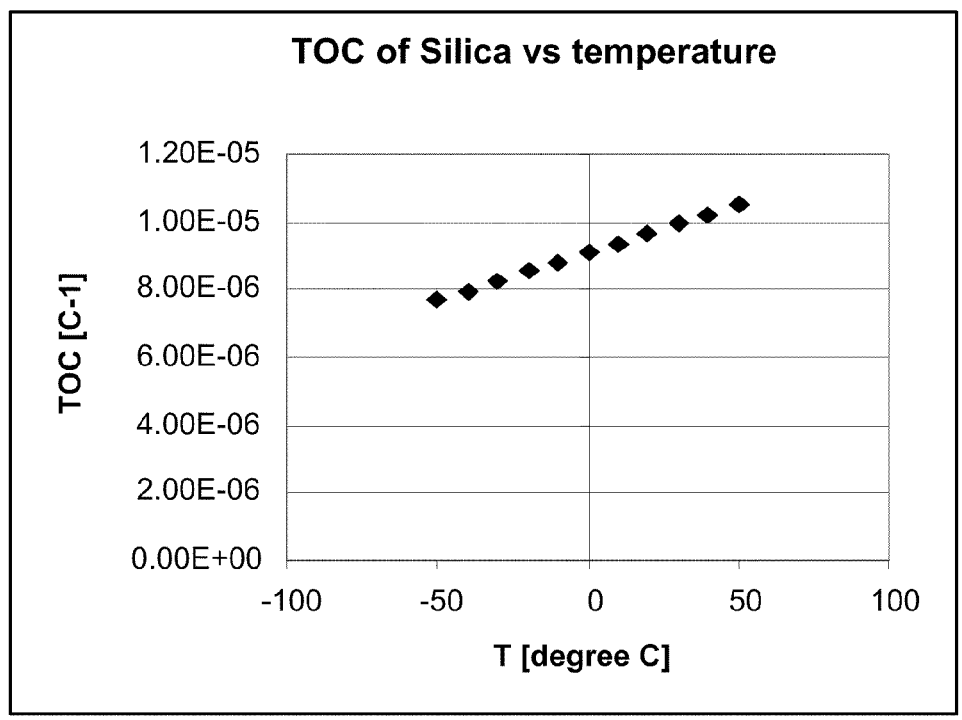
FIG. 3 is a plot of the measured thermo-optic coefficient (TOC) versus temperature for silica.

FIG. 3 is a plot of the measured thermo-optic coefficient (TOC) versus temperature for silica. Silica is commonly used as the base waveguide material in an AWG, although other materials may also or alternatively be used. The TOC, or $n_{1x}$, of a material is defined as the derivative of the index of refraction of the material with respect to temperature. As can be seen in FIG. 3, the TOC of silica has a noticeable temperature dependency which varies positively with temperature. It follows from (eq. 1) that an AWG composed entirely of silica waveguides can experience significant center wavelength variation with temperature.

In order to improve the athermal behavior of an AWG, a conventional technique involves substituting a different material in part of the optical path within the AWG. In particular, the conventional technique involves etching transversely oriented slots across the array of waveguides and filling them with a compensation material such as a polymer. The compensation material is usually chosen to have an effective index of refraction that varies with respect to temperature in the opposite direction from that of the base waveguide material. However, compensation material having an effective index of refraction that varies in the same direction as that of the base waveguide material can be used instead, if other adjustments are made. The temperature dependencies of these materials are conventionally modeled only linearly (i.e. to the first order), so the following analysis could be used to select or engineer a target compensation material. In particular, in an AWG that has been conventionally athermalized by etching slots across the silica waveguides and filling them with a polymer, the center wavelength is given by $$\lambda_c = \frac{n_g \Delta L_g + n_p \Delta L_p}{m} \quad \text{(eq. 2)}$$

where $n_g$ and $n_p$ are the effective refractive indices of the silica and polymer respectively, $\Delta L_g$ is the increment between adjacent waveguides in the total physical length of glass segments encountered longitudinally by the optical energy, and $\Delta L_p$ is the increment between adjacent waveguides in the total physical length of polymer segments encountered longitudinally by the optical energy. The parameters $n_g$ and $n_p$ are then modeled as having a linear variation with temperature. This is represented mathematically as:

$$n_g = n_{0g} + n_{1g}T \quad \text{(eq. 3)}$$

and $$n_p = n_{0p} + n_{1p}T \quad \text{(eq. 4)}$$

where $$n_{0x} = n_x|_{T=0} \quad \text{(eq. 5)}$$

and $$n_{1x} = \frac{dn_x}{dT}\bigg|_{T=0} \quad \text{(eq. 6)}$$

for $x = g$ and $x = p$.

Each material is therefore characterized with two index of refraction terms, a 0'th order term $n_{0x}$, and a first order term $n_{1x}$.

For athermal behavior, $\lambda_c$ is a constant. This is represented mathematically as $$\frac{d\lambda_c}{dT} = 0 \quad \text{(eq. 7)}$$

So assuming $$\frac{d\Delta L_g}{dT} = \frac{d\Delta L_p}{dT} = 0 \quad \text{(eq. 8)}$$

either because the contributions from the $\Delta L$'s are negligible or because their contributions have been lumped into those of the effective indices of refraction, then athermal behavior requires $$\frac{dn_g}{dT}\Delta L_g + \frac{dn_p}{dT}\Delta L_p = 0 \quad \text{(eq. 9)}$$

Substituting for $n_g$ and $n_p$ yields $$n_{1g}\Delta L_g + n_{1p}\Delta L_p = 0 \quad \text{(eq. 10)}$$

or $$\frac{\Delta L_p}{\Delta L_g} = -\frac{n_{1p}}{n_{1g}} \quad \text{(eq. 11)}$$

Thus, if a particular polymer were chosen whose linearlized variation with respect to temperature was $n_{1p}$, then the conventional technique would produce a ratio $\Delta L_p/\Delta L_g$, the ratio of the total polymer physical length increment to that of the silica between adjacent waveguides in the array. This ratio could then be used to determine the total required length of the polymer in the optical path, which could then be divided up according to other principles into a plurality of transversely oriented polymer-filled slots.

Figure 4:
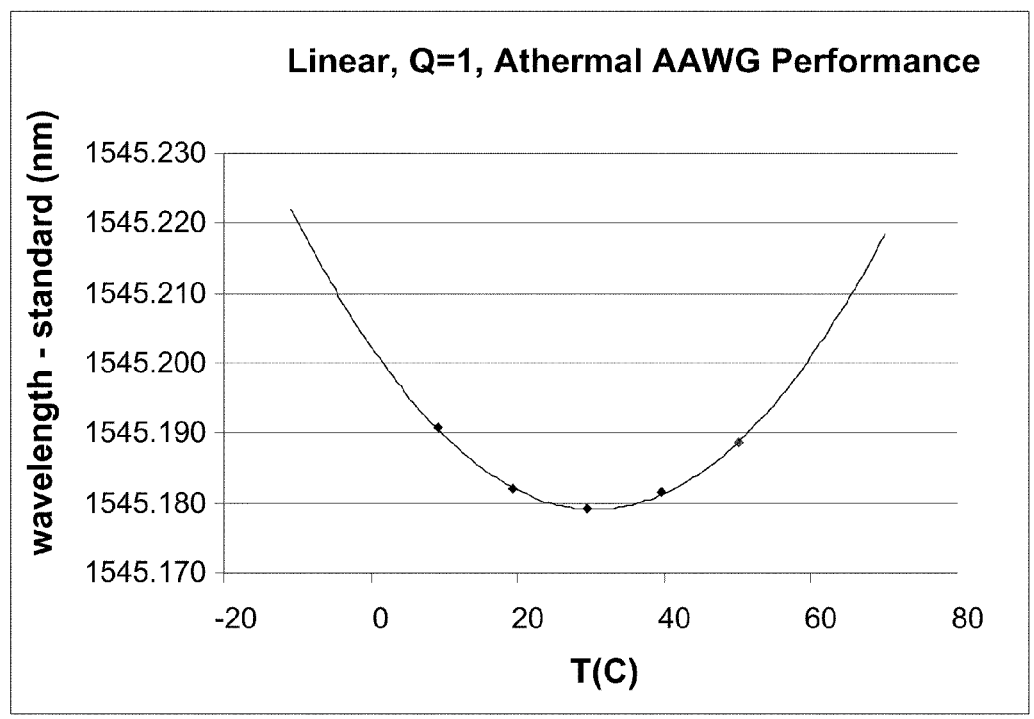
FIG. 4 is a plot showing the measured center wavelength temperature dependency of an AWG made according to a linearly athermalized technique.

FIG. 4 is a plot showing the measured center wavelength temperature dependency of an AWG made according to this linearly athermalized technique. As can be seen in FIG. 4, significant center wavelength variation remains in the linearly athermalized AWG.

In FIG. 4, the temperature dependent shape of the center wavelength variation is roughly a parabola, and we consider it as such herein. The strength of the wavelength variation is determined by the variation in the TOCs of the silica and the polymer over temperature. The roughly parabolic shape of the center wavelength variation can be approximated mathematically as:

$$\lambda - \lambda_0 \approx \lambda_2^e(T - T_{min})^2 \quad \text{(eq. 12)}$$

where $\lambda_0$ is the minimum center wavelength at the temperature $T_{min}$, and $\lambda_2^e$ is the second order coefficient of the effective wavelength variation for the linearly athermalized waveguide with respect to temperature T. The second order coefficient $\lambda_2^e$ can be represented mathematically as the sum of a second order coefficient $\lambda_2^g$ due to the silica and a second order coefficient $\lambda_2^p$ due to the polymer. For the data in FIG. 4, $\lambda_2^e$ is approximately 2.5E–05 nm/C/C, with $\lambda_2^g$ being about 1.5E–05 nm/C/C and $\lambda_2^p$ being about 1.0E–05 nm/C/C.

Figure 5:
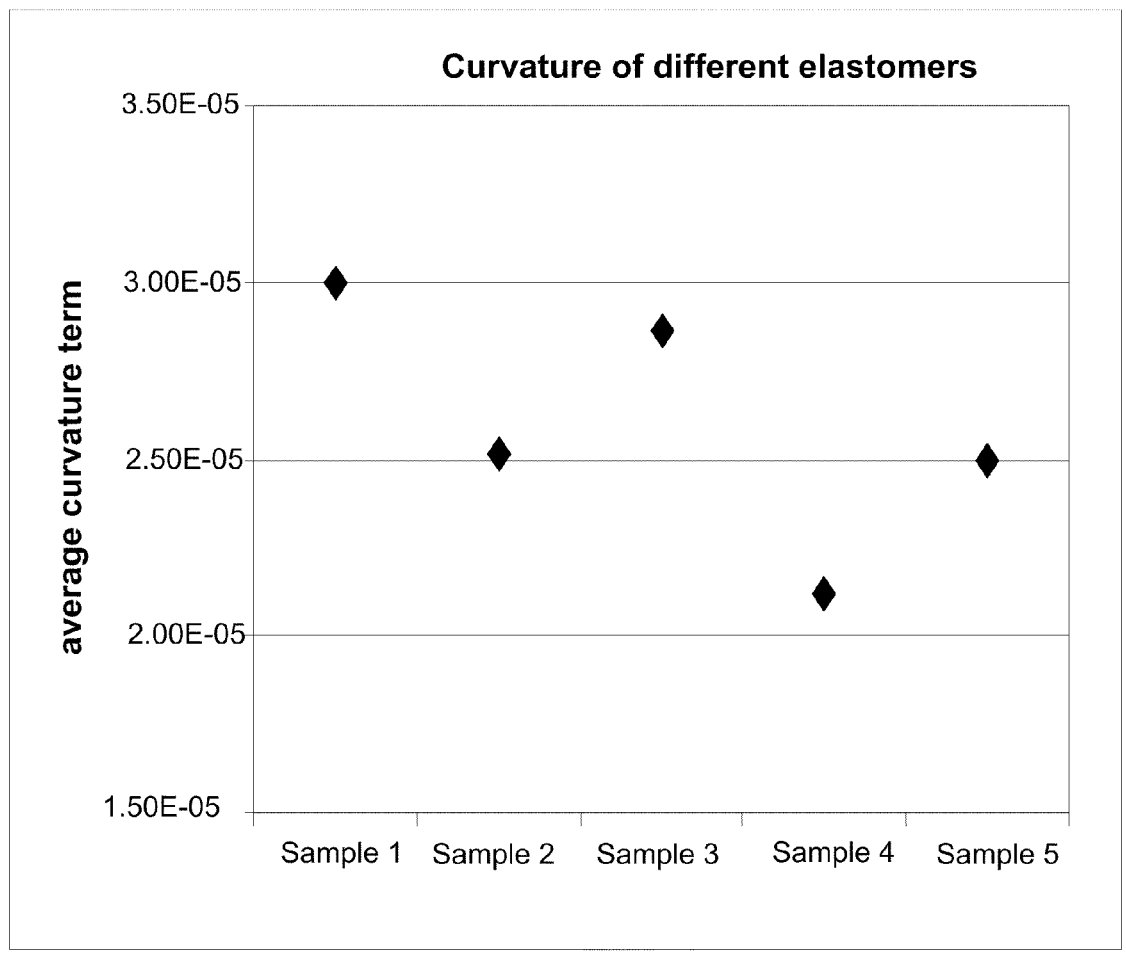
FIG. 5 is a plot showing the measured effective second order wavelength variation coefficient $\lambda_2^e$ various waveguides which have been linearly athermalized using different polymers.

FIG. 5 is a plot showing the measured effective second order wavelength variation coefficient $\lambda_2^e$ various waveguides which have been linearly athermalized using different sample polymers. As can be seen in FIG. 5, the linearly athermalized waveguides exhibit nearly identical thermo-optic curvature characteristics regardless of the polymer used.

An opportunity therefore arises to provide arrayed waveguide grating devices that exhibit athermalization with much better accuracy than conventional linear athermalization techniques, or over a much wider temperature range, or both. As described in more detail below, Applicants have discovered that a compensation material within slot elongated in a direction parallel to a segment of waveguide in an arrayed waveguide grating apparatus can compensate for both first and second order change in refractive index of the base waveguide material over temperature. Unlike the transverse slots of conventional linear athermalization techniques, the elongated slot generally parallel to the base material defines a composite waveguide section having a second order effective index of refraction temperature dependency which can be utilized to accurately minimize the temperature dependence of the overall optical path length to both the first and second order. The techniques described herein are also generalizeable to neutralization of the optical path length temperature dependence to any order.

Figure 6:
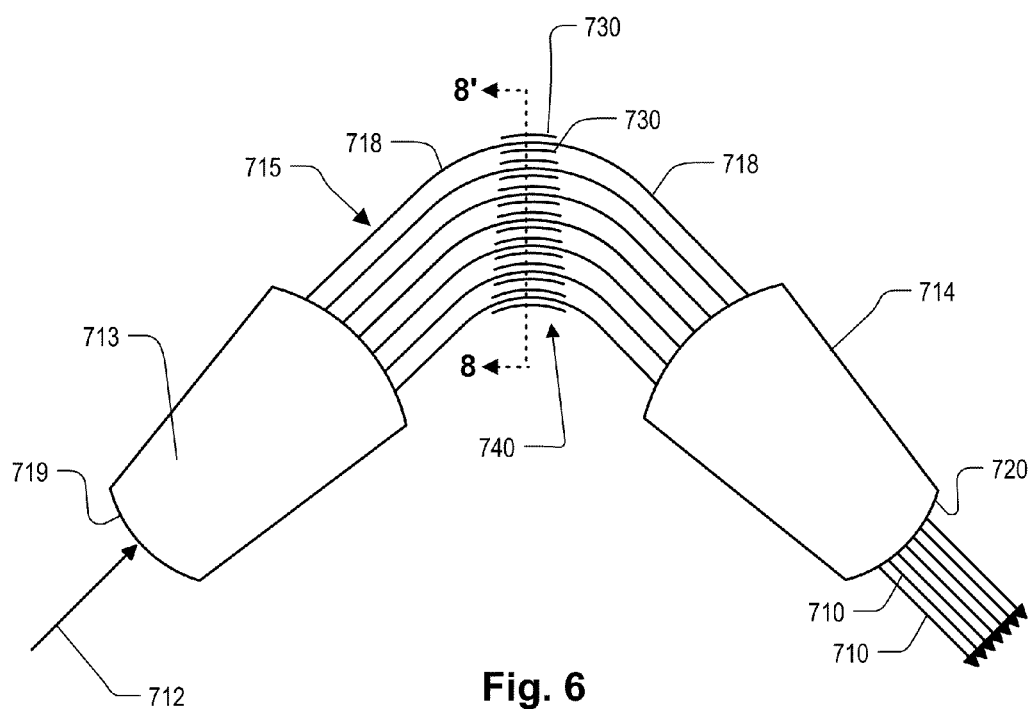
FIG. 6 illustrates an AWG wavelength division multiplexer/de-multiplexer that has been athermalized utilizing slots elongated in a direction parallel to the waveguides by taking second order temperature dependencies into account.

FIG. 6 illustrates an AWG wavelength division multiplexer/de-multiplexer that has been athermalized utilizing slots 730 elongated in a direction parallel to the waveguides by taking second order temperature dependencies into account. It comprises a substrate or "die" (not shown) having provided thereon an arrayed waveguide grating 715 (also called a prism region) comprising an array of channel waveguides 718, only some of which are shown, which are optically coupled between two planar (slab or free-space) waveguide coupling regions 713 and 714. At least input waveguide 712 is optically coupled to an input face (or boundary) 719 of the first slab waveguide 713 for inputting a multiplexed input signal thereto, and a plurality of output waveguides 710 (only some shown) are optically coupled to an output face (or boundary) 720 of the second slab waveguide 714 for outputting respective wavelength channel outputs therefrom to the face 720. In one embodiment the input and output waveguides 712 and 710 preferably are integrated on the same die as the grating 715 and the two coupling regions 713 and 714, but in another embodiment they can be optical fibers, for example, or lens systems. The geometries of the slab waveguide regions 713 and 714 are both well known, and described for example in U.S. Pat. No. 6,768,842, which is incorporated by reference herein.

The device in FIG. 6 can be operated as a multiplexer rather than a de-multiplexer simply by reversing the optical energy flow direction. Also, in some embodiments, the waveguide 712 in optical communication with the input face 719 of the first slab waveguide 713 is replaced by a plurality of waveguides at different positions along the face 719. Typically, a "vernier" calibration process is used to identify the single one of these waveguides whose position along the face 719 provides the best performance, and that is the only waveguide that is used in general operation. In such an embodiment, waveguide 712 in FIG. 6 can be thought of as the one waveguide selected from the plurality. In still other embodiments the device operates as a router in which multiple inputs and multiple outputs are in use simultaneously.

In a generally known manner, there is a constant predetermined effective optical path length difference $\Delta L_x$ between adjacent channel waveguides 718 in the array 715. Typically, the physical length of the waveguides increases incrementally by the same amount from one waveguide to the next. The effective optical path length difference $\Delta L_x$ determines the position of the different wavelength output channels on the output face 720 of the second slab waveguide 714. As is typical for other AWG's, the physical length of the waveguides in the array increases incrementally by the same amount, $\Delta L_g$, from one waveguide to the next.

The slots 730 are filled with a compensation material and are elongated in a direction parallel to the core of the waveguides 418. As used herein, the term "material" can be made up of one or more other materials, either mixed together, or layered, or combined in some other manner to make the overall "material." Using the techniques described herein, the slots 730 are shaped and sized to define composite waveguide sections 740 having a second order effective index of refraction temperature dependency which minimizes the temperature dependence of the overall optical path length to both the first and second order. The term "composite waveguide section" as used herein refers to a stretch of waveguide that is influenced by the slots alongside it.

The device in FIG. 6 is athermalized by taking into account the first and second order temperature dependency of the composite waveguide sections 740 and the first and second order temperature dependency of the remaining waveguide sections (or non-parallel-slotted sections).

The center wavelength of the device in FIG. 6 is given by $$\lambda_c = \frac{n_c \Delta L_c + n_r \Delta L_r}{m} \quad \text{(eq. 13)}$$

where $n_c$ is the effective index of refraction of each of the composite waveguide sections 740, $\Delta L_c$ is the increment between adjacent waveguides in the operative length of the composite waveguide sections 730 encountered longitudinally by the optical energy, $n_r$ is the effective index of refraction of the remaining sections of the waveguides, and $\Delta L_r$ is the increment between adjacent waveguides in the total physical length of the remaining non-composite sections of the waveguides encountered longitudinally by the optical energy. $\Delta L_x$ is therefore given by the sum of $\Delta L_c$ and $\Delta L_r$. In some embodiments, the remaining non-composite sections of waveguide provide conventional linear athermalization as described above. In such a case, the remaining waveguide sections are a combination of the path length increment in glass and polymer. This can be represented mathematically as:

$$n_r \Delta L_r = n_g \Delta L_g + n_p \Delta L_p = \left( n_g + n_p \frac{\Delta L_p}{\Delta L_g} \right) \Delta L_g$$

The operative length increment $\Delta L_c$ of the composite waveguide sections 730 depends on the proximity, shape and materials within the slots 730, along with other factors. The operative length increment $\Delta L_c$ is thus not necessarily the increment between adjacent waveguides in the physical length of the slots 730. The operative length increment $\Delta L_c$ is intended to reflect a lumped measure which takes into account the variations in the amount of influence on the optical energy flow that the slot 730 has along its length. It does not matter, for the purposes of this discussion, how the operative length of the composite waveguide sections 730 are calculated, so long as the same method is used for all waveguides 718.

The parameters $n_c$ and $n_r$ are modeled as having a quadratic variation with temperature by taking second order terms into account. This is represented mathematically as:

$$n_c = \Delta n_{0c} + n_{1c} T + n_{2c} T^2 \quad \text{(eq. 14)}$$

and $$n_r = \Delta n_{0r} + n_{1r} T + n_{2r} T^2 \quad \text{(eq. 15)}$$

where $$n_{0x} = n_x |_{T=0} \quad \text{(eq. 16)}$$

$$n_{1x} = \frac{dn_x}{dT} \bigg|_{T=0} \quad \text{(eq. 17)}$$

and $$n_{2x} = \frac{d^2 n_x}{dT^2} \bigg|_{T=0} \quad \text{(eq. 18)}$$

for $x = c$ and $x = r$.

We can therefore write:

$$\frac{dn_c}{dT} = n_{1c} + 2T n_{2c} \quad \text{(eq. 19)}$$

and $$\frac{dn_r}{dT} = n_{1r} + 2T n_{2r} \quad \text{(eq. 20)}$$

Substituting (eq. 19) and (eq. 20) into (eq. 7) for athermal behavior yields:

$$(n_{1c} + 2Tn_{2c})\Delta L_c + (n_{1r} + 2Tn_{2r})\Delta L_r = 0 \quad \text{(eq. 21)}$$

Re-arranging and collecting the terms in T in (eq. 21) yields:

$$2T(\Delta L_c n_{2c} + \Delta L_r n_{2r}) + (\Delta L_c n_{1c} + \Delta L_r n_{1r}) = 0 \quad \text{(eq. 22)}$$

Thus, by taking into account second order dependencies of the composite waveguide sections 740 and those of the remaining waveguide sections, it can be seen that athermal behavior to the first and second order requires both:

$$\Delta L_c n_{1c} + \Delta L_r n_{1r} = 0 \quad \text{(eq. 23)}$$

and $$\Delta L_c n_{2c} + \Delta L_r n_{2r} = 0 \quad \text{(eq. 24)}$$

For a given AWG device, the first and second order dependencies of the effective index of refraction $n_r$ of the non-parallel slotted sections will depend on the first and second order terms for the index of refraction of polymer and glass, as well as the polymer to glass path length ratio $\Delta L_p/\Delta L_g$. Then, by appropriate design of the size, shape and material(s) for the slots 730, along with the index and path length increment of the operative length increment $\Delta L_c$ the effective index of refraction $n_c$ of the composite waveguide sections 740 can be designed to satisfy both (eq. 23) and (eq. 24). In other words, second order athermalization is achieved due to the first and second order temperature dependency of the effective index of refraction $n_c$ of the composite waveguide sections 740, which counters the first and second order temperature dependency of the effective index of refraction $n_r$ of the remaining waveguide sections.

The compensation material within the slots 730 has an effective index of refraction temperature dependency with differs from that of the core and cladding materials of the channel waveguides 718. As a result, at least three variables can be adjusted to design parallel slots 730 which satisfy both (eq. 23) and (eq. 24) as described herein. First, a stronger decrease in the overall effective wavelength curvature (i.e. second order temperature dependency) can be achieved by choosing a compensation material which exhibits a higher index of refraction at a given temperature. Alternatively, a weaker decrease can be obtained by choosing a compensation material which exhibits a lower index of refraction at a given temperature. Second, a stronger effect on the overall effective wavelength curvature can be obtained by disposing the slots 730 closer to the core centerlines of the waveguides 718. Alternatively, a weaker effect can be obtained by disposing the slots 730 farther from the core centerlines. Both of these variables operate by affecting the optical mode profile through modification of the light distribution in the composite waveguide section 740 versus temperature, as discussed in more detail below. Third, a stronger effect can be obtained by designing the slots 730 using a larger $\Delta L_c$, and a weaker effect can be obtained by designing them using a smaller $\Delta L_c$. Alternatively, $\Delta L_r$ and the index of refraction $n_r$ of the remaining waveguide sections can be adjusted. A designer can then vary the above variables until the net curvature of the wavelength temperature dependence throughout a desired temperature range is minimized.

Figure 7:
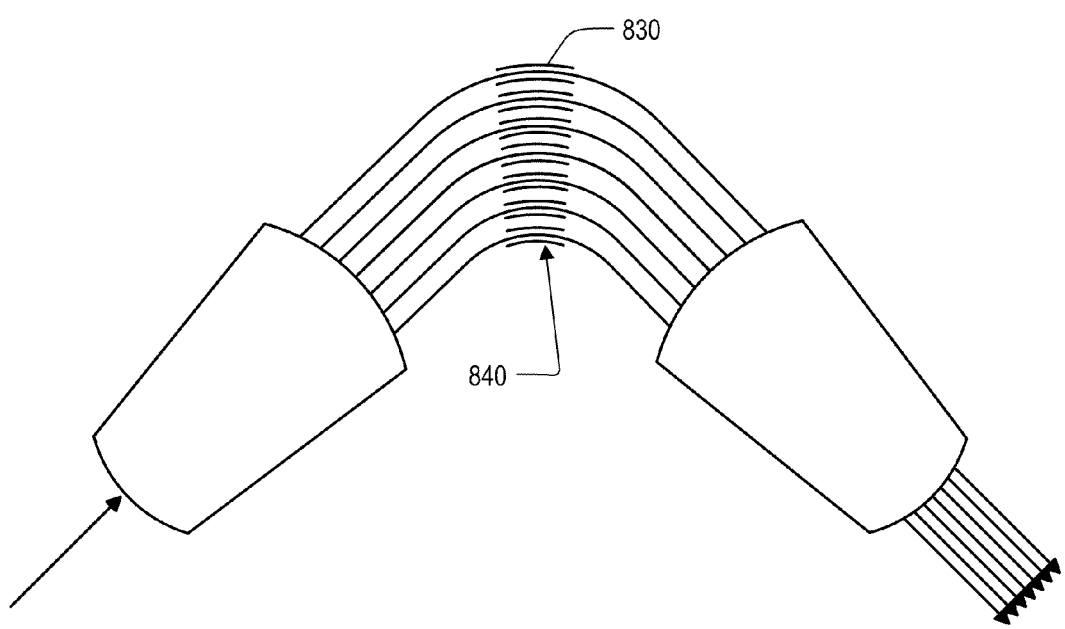
FIG. 7 illustrates another embodiment of the AWG illustrated in FIG. 6.

In FIG. 6, the slots 730 have lengths that occupy a longer segment of the channel waveguides 718 that they straddle, for progressively shorter waveguides 718. This is appropriate in order to satisfy (eq. 22). According to that equation, if $n_{1c}$ and $n_{1r}$ are of the same sign, the equations can be satisfied only if the operative length increment $\Delta L_c$ of the composite waveguide sections 740 is of the opposite sign as the increment $\Delta L_r$ of the non-parallel slotted sections. In addition, in preferred embodiments $n_{1c}$ is designed to be smaller than $n_{1r}$, so that the slots 730 do not have to be as long or longer than the branch waveguides 718. In another embodiment, as shown in FIG. 7, the composite waveguide sections 840 can have an effective index of refraction variation with temperature which is of the opposite sign as that of the remaining waveguide sections. In such a case, the slots 830 have lengths that occupy a longer segment of the channel waveguides 840 that they straddle, for progressively longer waveguides.

Figure 8:
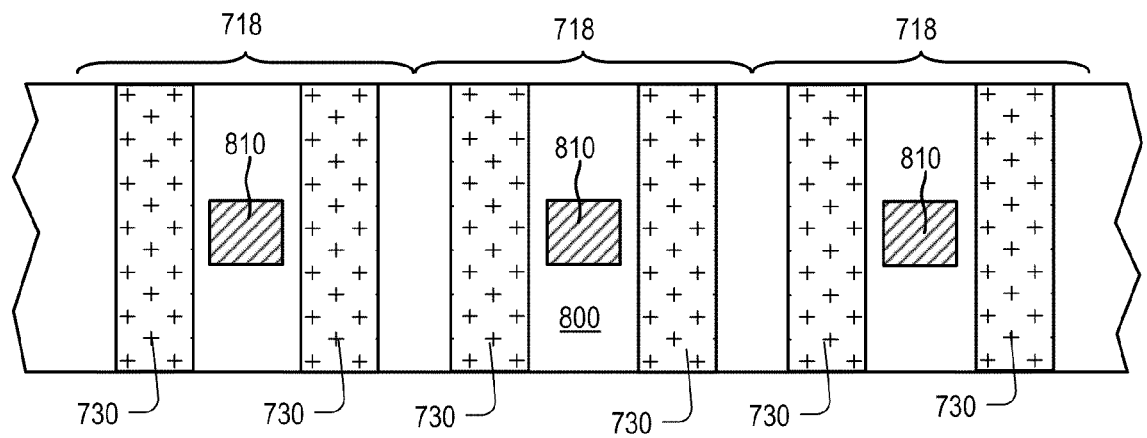
FIG. 8 is a cross-section of a portion of the channel waveguides, taken along the sight lines 9-9' in FIG. 6.
Figure 9:
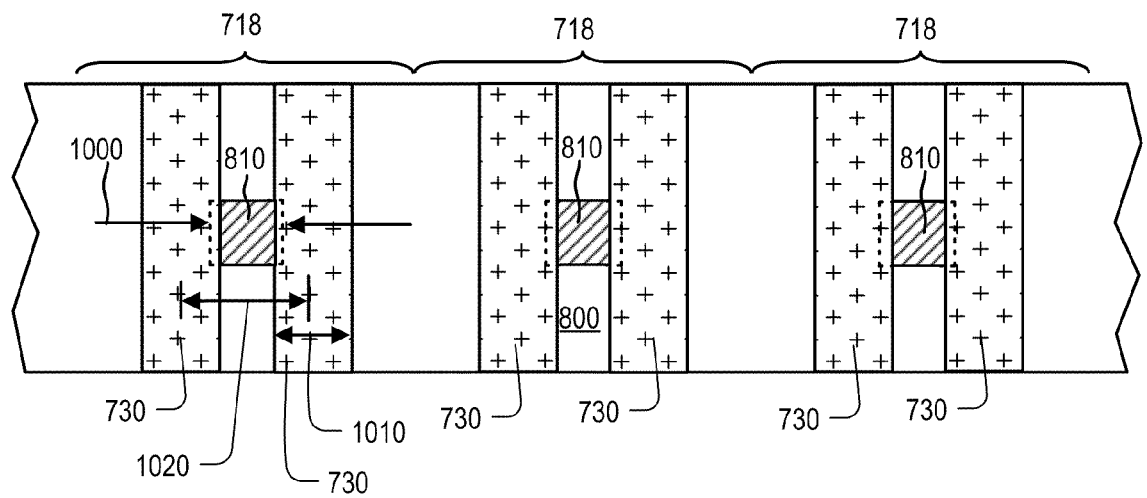
FIG. 9 is a cross-section of another embodiment of the channel waveguides.

FIG. 8 is a cross-section of a portion of the channel waveguides 718, taken along the sight lines 8-8' in FIG. 6. Each of the waveguides 718 includes a core material 810 within a cladding material 800. As can be seen in FIG. 8, each of the waveguides 718 includes a pair of slots 730 straddling the core material 810. In FIG. 8 the slots 730 do not cross into the core region of the waveguides 718. In another embodiment, as shown in FIG. 9, the slots 730 do cross into the core region of the waveguide 718. In the embodiment illustrated in FIG. 9, the core material 810 is Germanium doped glass with a refractive index of about 1.47 and has a square-cross section with a width 1000 of 4 μm. The core material 810 is surrounded by a glass cladding 800 having a refractive index of about 1.45. The slots 730 have a width 1010 of 4.4 μm and a center-to-center distance 1020 between the pair of inserts 730 straddling a given core of 7.6 μm.

Figure 10:
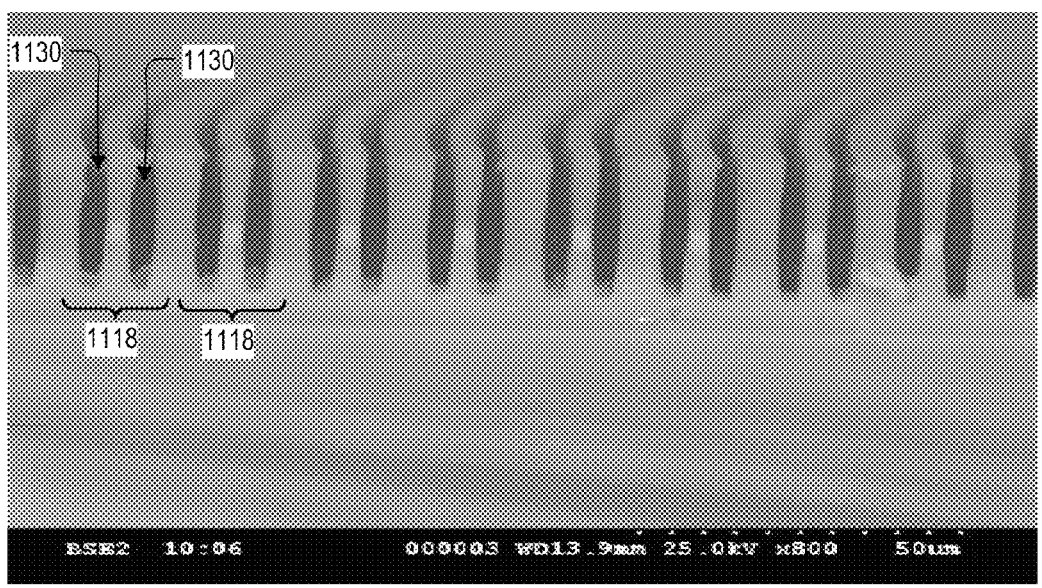
FIG. 10 is an image of a manufactured device having elongated slots generally parallel to the waveguides as described herein.

The structure of FIG. 6 can be fabricated using well-known techniques. In a known manner, the transmission waveguides 718 and slab waveguides 713, 714 are formed (e.g. using standard photolithographic techniques) as "cores" on a silicon substrate. An oxide layer and/or cladding layer may be provided on the substrate prior to depositing the waveguide cores. The cores are then covered in cladding material, using for example Flame Hydrolysis Deposition (FHD) or Chemical Vapor Deposition (CVD) fabrication processes. The slots 730 are then etched photolithographically, and the compensation material is applied using a volumetrically controlled syringe dispenser and then cured, either thermally or using actinic radiation depending on the choice of compensation material. Alternatively, the compensation material can be deposited into the slots 730 by sputtering or any other method. FIG. 10 is an image of a manufactured device having elongated slots 1130 generally parallel to the waveguides 1118 as described herein.

In addition to providing athermalization, the slots 730 elongated in a direction parallel to the waveguides act to maintain confinement of the optical energy carried in the remaining non-composite sections. In conventional linear athermalization techniques using transverse slots to replace a section of waveguide with another material, confinement of the optical energy in this portion is lost. This is due to the fact that the optical energy is not guided by the material of the transverse slots. As a result, optical energy being guided by the waveguide which enters the transverse slots can propagate outwardly into the region surrounding waveguide where it cannot be recovered, rather than being coupled into the next section of waveguide.

In contrast, slots 730 elongated in a direction parallel to the waveguides as described herein maintain confinement of the optical energy in at least one dimension orthogonal to a direction of propagation of the optical energy. This confinement is due to the index contrast at the outermost sides of the slots 730 along the direction of propagation of the optical energy. Due to the differences between the cladding and compensation materials, this index contrast at the outermost interface between the compensation material and the cladding material provides substantially total internal reflection which provides confinement of the optical energy. Thus, optical energy within the compensation material can be coupled into the next section of waveguide, rather than being lost.

For example, in the embodiment illustrated in the cross-section of FIG. 8, core material 800 is adjacent to the left side of the left slot 730 and the right side of the right slot 730 of each waveguide 718. As a result, the optical energy is confined in the horizontal dimension.

In addition to providing athermalization, it is desirable that the slots 730 do not give rise to additional losses in the AWG. As described below, this can be achieved by designing the slots 730 to enter the path of the optical beams adiabatically, or nearly so.

Figure 11:
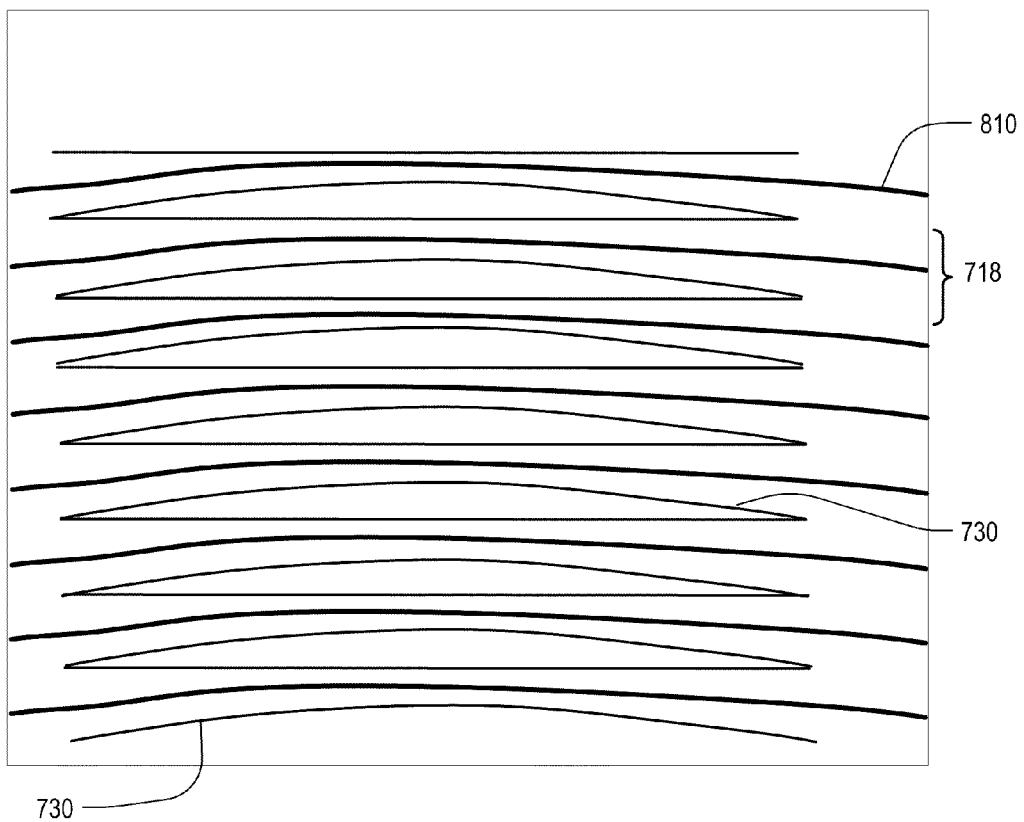
FIG. 11 is a top view of a portion of the channel waveguides having small additional losses introduced by the slots, where slots from adjacent composite waveguides meet.

FIG. 11 is a top view of a portion of the channel waveguides 718 having small additional losses introduced by the slots 730. In FIG. 11, the slots 730 include proximal and distal ends and curve away from the core material 810 they straddle at both ends. This is one way of minimizing the loss as the optical energy in the waveguides 718 encounters the slots 730. In the embodiment shown in FIG. 11, each of the slots is shown curving to the point where it meets the near slot for the next adjacent waveguide 718. This can help minimize the loss because it maximizes the distance between the beginning of each slot 730 and the waveguide cores. In other embodiments, it is not necessary that the ends of the slots meet.

Figure 12:
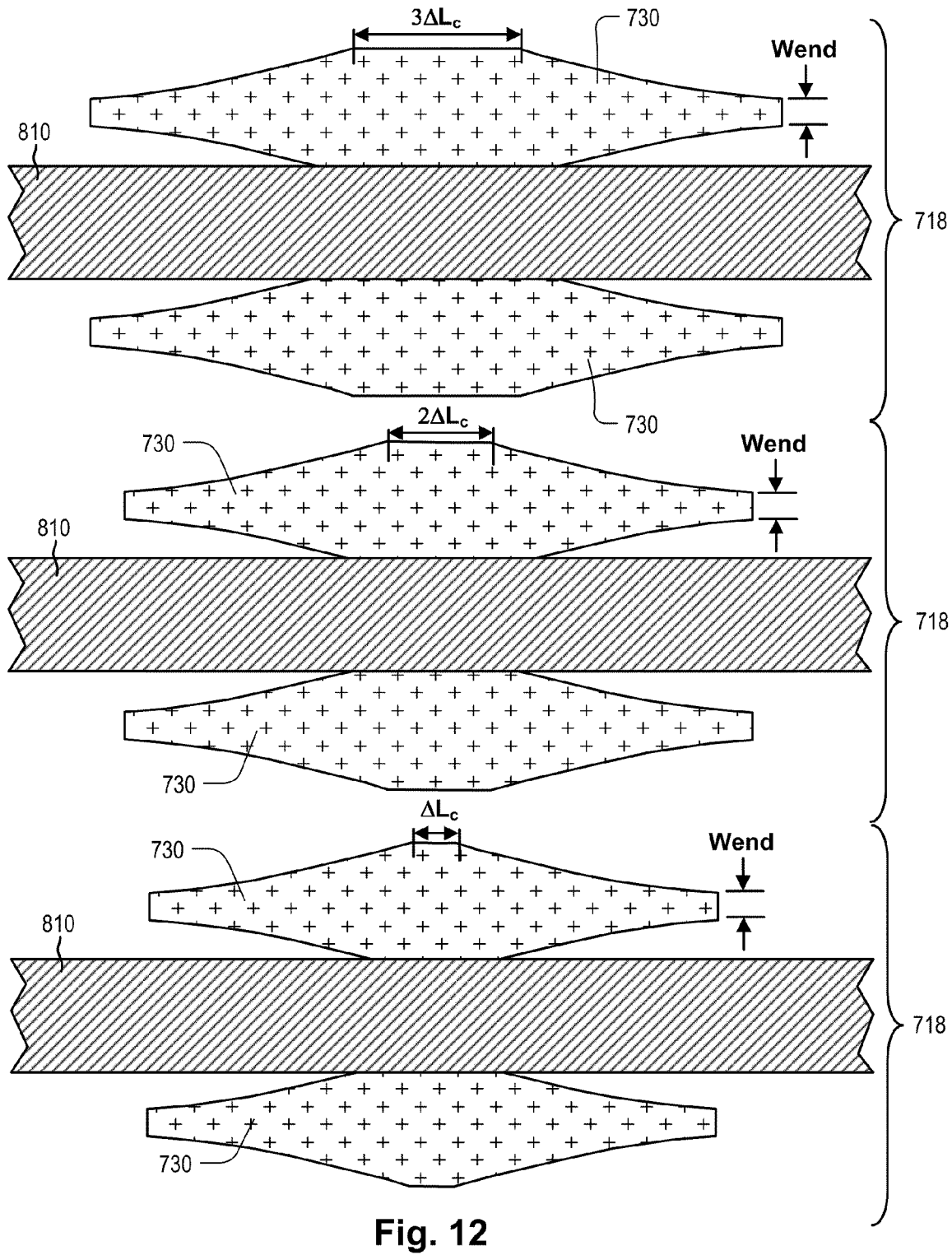
FIG. 12 is a top view of a portion of another embodiment of the channel waveguides, where slots from adjacent composite waveguides do not meet.

FIG. 12, not to scale, is a top view of a portion of another embodiment of the channel waveguides 718. Instead curving the slots 730 away from the cores 810, the slots 730 have ends which are adiabatically tapered down to a width Wend. The gradual or adiabatic variation at the input and output sections of the slots 730 ensures that little to no optical light is scattered when the light in the waveguide 718 begin to interact with the slots 730. The lengths and widths of the adiabatic sections of the slots 730 can be chosen using for example beam propagation method (BPM) simulations to optimize the length and minimize loss. The absolute lengths of the adiabatic sections should not affect the net curvature of the wavelength versus temperature curve of the waveguides 718, as long as the adiabatic sections have the same length in all the slots 730.

Figure 13:
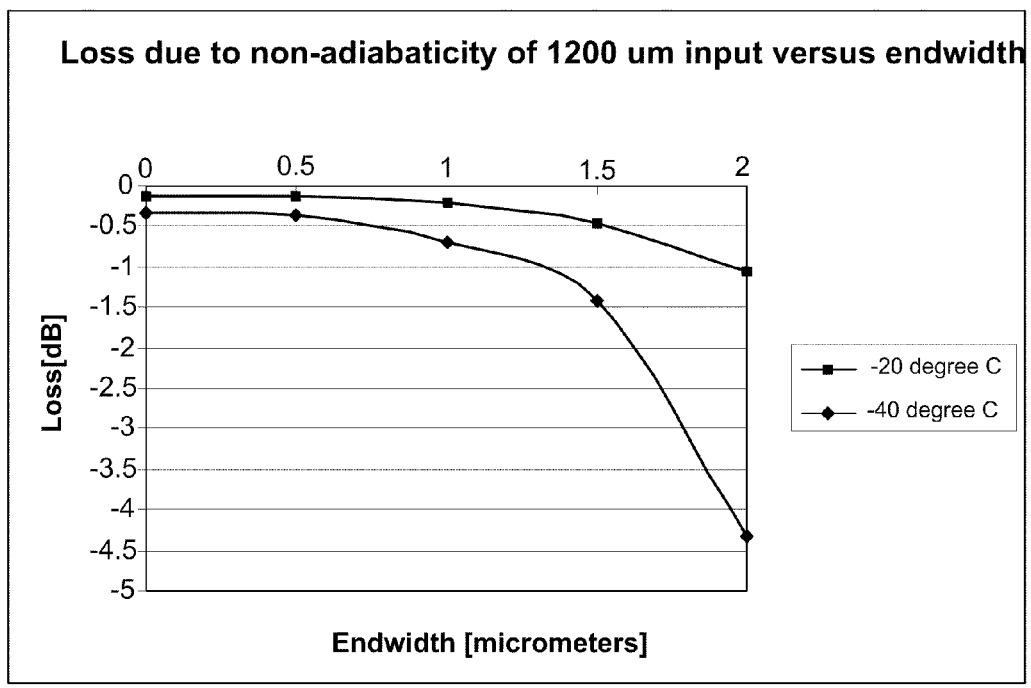
FIG. 13 is a plot of the insertion loss versus end width of the tapered slots illustrated in FIG. 12.

FIG. 13 is a plot of the simulated insertion loss versus width Wend of the tapered slots 730. As shown in FIG. 13, an insertion loss penalty of less than 0.5 dB can be achieved with a width Wend as large as 0.5 µm, even at −40 degrees C.

Yet another way to minimize loss is to vary the depth of the slots 730 in the vertical dimension relative to the depth of the core material 810, or the thickness of the slots 730 in the vertical dimension. In certain embodiments, these may be more difficult to achieve than tapering or curving away in transverse dimension, but may be appropriate for other embodiments.

Figure 14A:
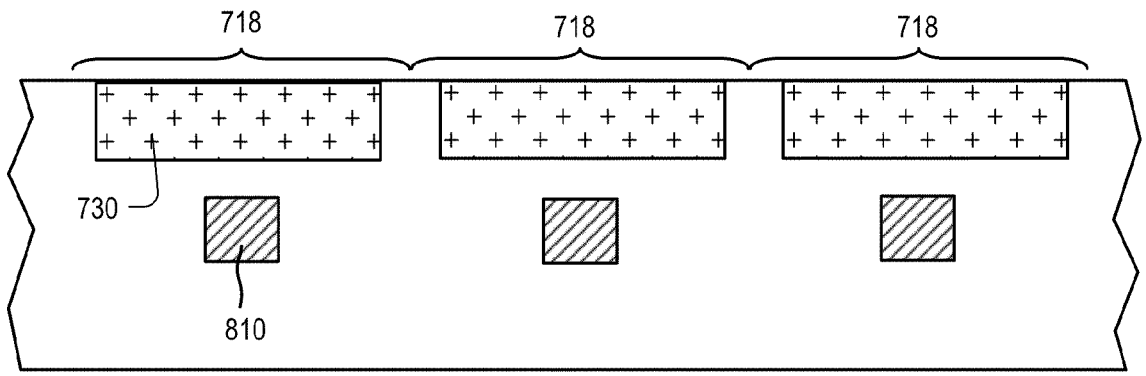
FIGS. 14A-14C illustrate cross-sectional views of a portion of the channel waveguides showing alternative configurations for the slots.
Figure 14B:
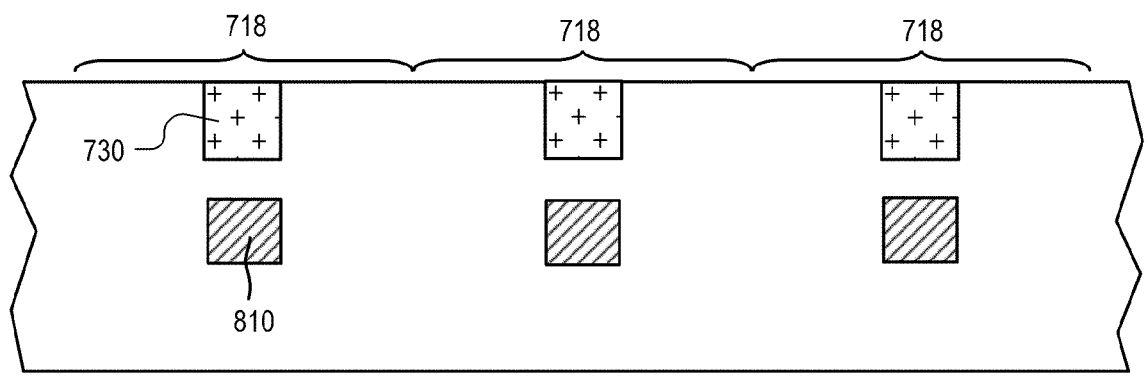
Figure 14C:
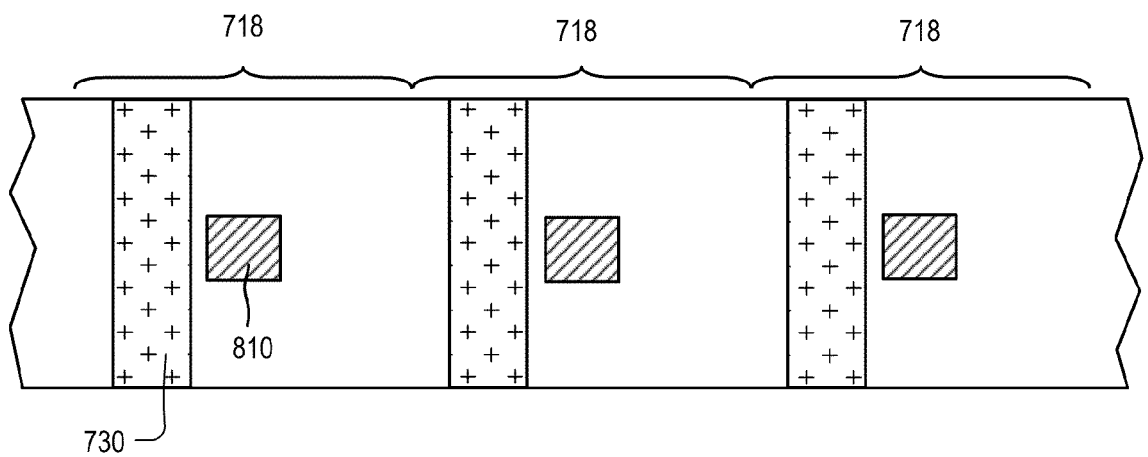

FIGS. 14A-14C illustrate cross-sectional views of a portion of the channel waveguides 718 showing alternative configurations for the slots 730. In FIG. 14A, the slots 730 have a relatively large width and are formed over the core material 810 of each of the waveguides 718. In such a case, the slot 730 for each waveguide 718 is discontiguous from the slots 730 of each of the other waveguides 718. In FIG. 14B the slots 730 have a width similar the width of the core material 810. In FIG. 14C each of the waveguides 718 includes a single slot 730 straddling one side of the core material 810.

Figure 15:
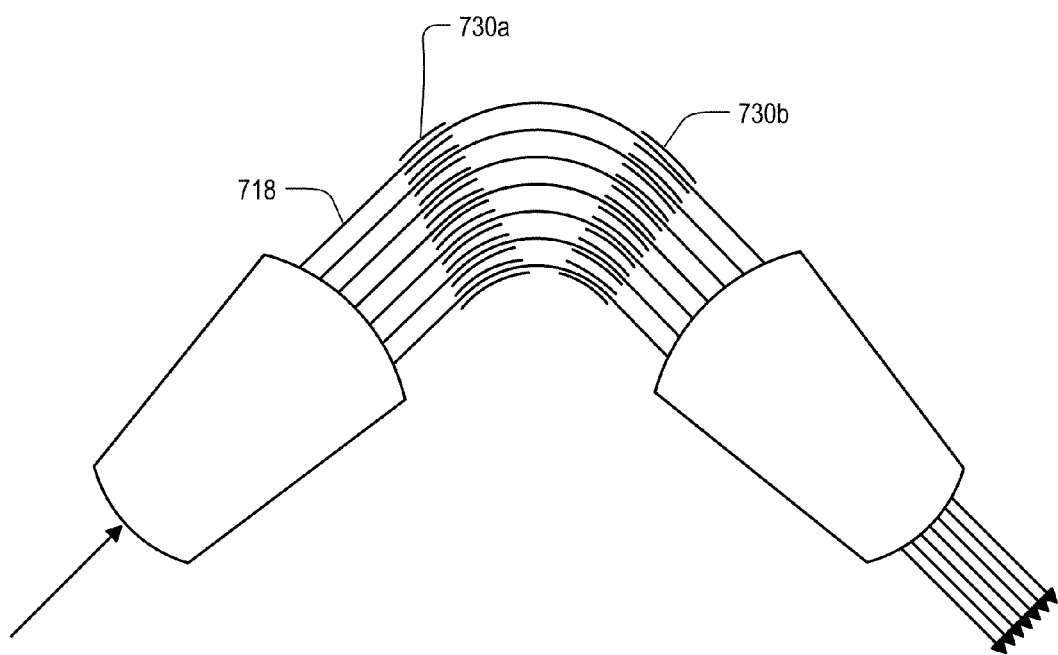
FIG. 15 illustrates an AWG device in which the elongated slots used for athermalization are segmented along the length of the waveguides.

FIG. 15 illustrates an AWG device in which the elongated slots used for athermalization are segmented along the length of the waveguides. In FIG. 15, the waveguides 718 include first slots 730a elongated in a direction parallel to one longitudinal segment, and second slots 730b elongated in a direction parallel to another longitudinal segment. In embodiments, one or more of the size, shape and compensation material in the first slots 730a may be different from those in the second slots 730b. For example, the first slots 730a may have a different cross-section than that the of the second slots 730b, for example being a different distance away from the core material of the waveguides 718.

Figure 16:
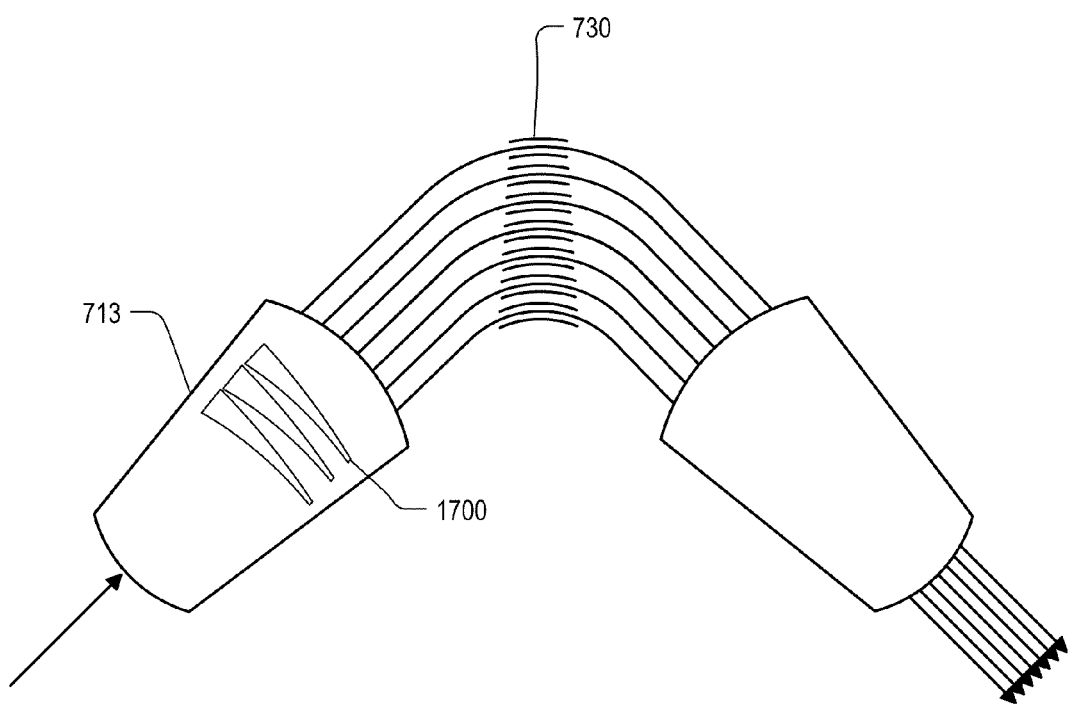
FIG. 16 illustrates an AWG device which includes elongated slots as described herein in conjunction with transversely oriented slots within the first slab waveguide.

FIG. 16 illustrates an AWG device which includes elongated slots 730 as described herein in conjunction with transversely oriented slots 1700 within the first slab waveguide 713. In this embodiment, the transversely oriented slots 1700 provide conventional linear athermalization, whereas the elongated slots 730 provide the second order athermalization as described herein. In some embodiments, the same compensation material may be used in both the elongated slots 730 and the transversely oriented slots 1700. Alternatively, different materials may be used. In one embodiment, both compensation materials are polysiloxanes, with the compensation material in the transverse slots 1700 having an index or refraction of about 1.46, and the compensation material in the parallel elongated slots 730 has an index of refraction of 1.42. In practice, the slots 730 not only provide second order curvature correction, but also creates a change in the slope of the wavelength versus temperature curve at a given temperature. Hence, the strength of the athermalization by the slots 1700 may have to be adjusted in conjunction with that of the slots 730. This adjustment of both the slots 1700 and the slots 730 can be achieved using the techniques described mathematically above.

As mentioned above, second order athermalization is achieved by designing the second order temperature dependency of the effective index of refraction $n_c$ of the composite waveguide sections 740, to counter the second order temperature dependency of the effective index of refraction $n_r$ of the remaining waveguide sections. The principle in creating sufficient second order temperature dependency of the effective index of refraction $n_c$ of the composite waveguide sections 740, is achieved through modification of the light distribution in the composite waveguide sections 740 versus temperature. FIGS. 17A-17D illustrate an example of the change in the cross-sectional light distribution versus temperature for an exemplary composite waveguide section 740 having a cross-section like that shown in FIG. 8. In FIGS. 17A-17D, the index of refraction of the compensation material in the slots 730 increases as the temperature decreases. This increase in the index of refraction of the compensation material will itself increase effective index of refraction of the composite waveguide section 740, because a certain percentage of the light is traveling through the slots 730. In addition, the light will redistribute itself towards this higher index of refraction region, the slots 730, with the change in temperature. This redistribution also acts to increase the effective index of refraction of the composite waveguide section 740, resulting in a 2nd order effect.

Figure 18:
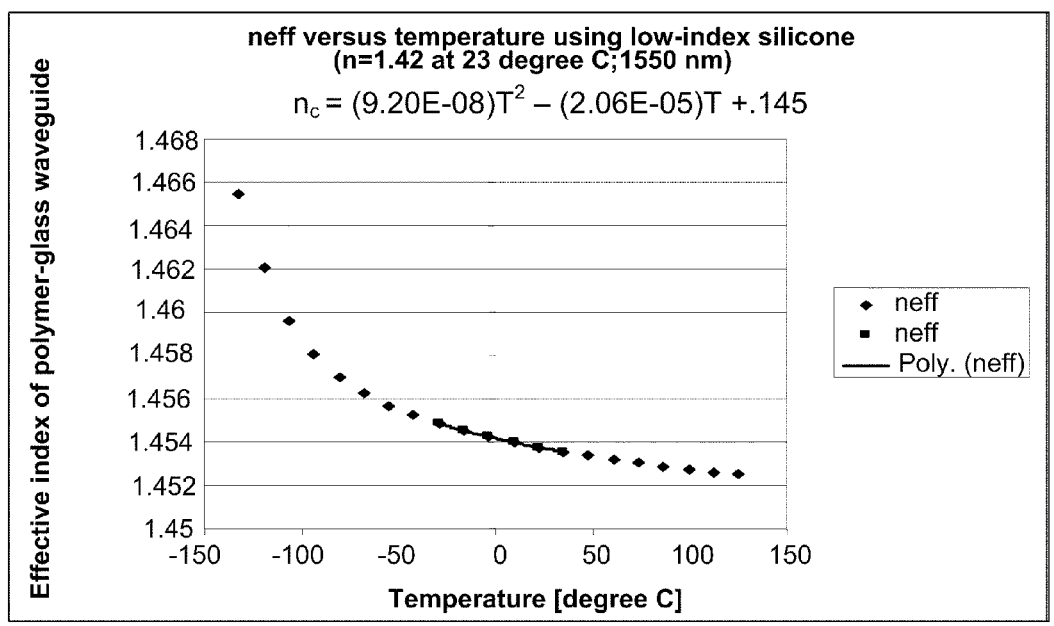
FIG. 18 is a plot of an example of a calculated effective index of refraction $n_c$ versus temperature for an exemplary composite waveguide section having a silica core.

FIG. 18 is a plot of an example of a calculated effective index of refraction $n_c$ versus temperature for an exemplary composite waveguide section having a silica core. The effective index of refraction $n_c$ is the weighted average of the refractive index of the different materials making up the composite structure. In this example, the compensation material is a polymer having an index of refraction of 1.42 at room temperature and a TOC of $n_{1p}$=3.5E−04. In this example, the calculated effective index of refraction $n_c$ of the composite waveguide section, when fitted to a quadratic equation, has the following coefficients:

$n_{0c}$=1.45
$n_{1c}$=−2.06E−05
$n_{2c}$=9.2E−08

Figure 19:
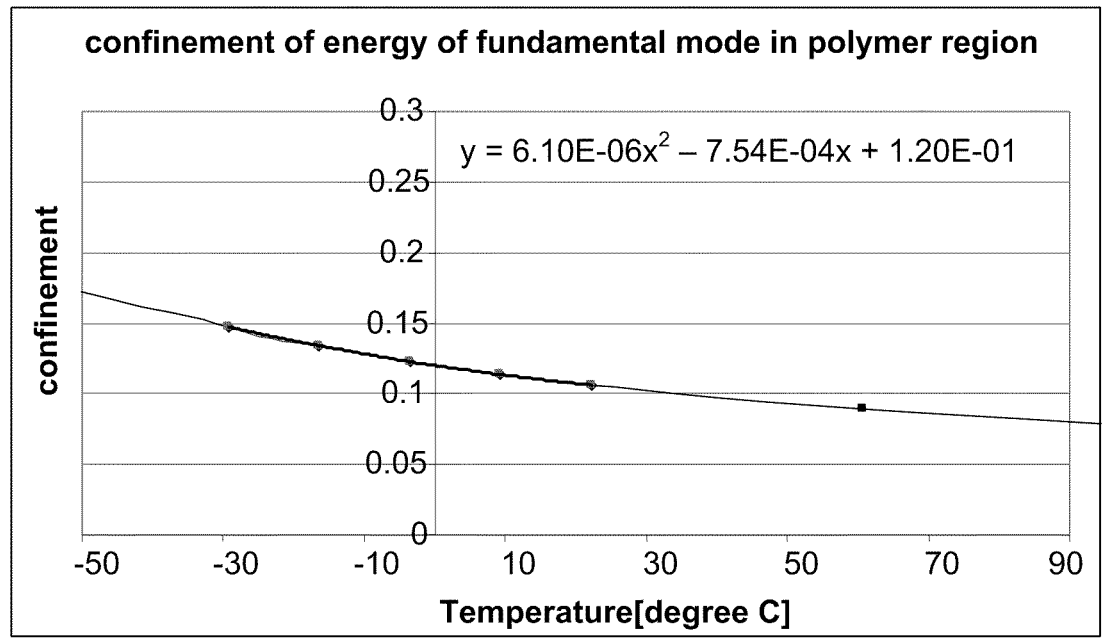
FIG. 19 is a plot of an example of a calculated confinement of energy of the fundamental mode within the elongated slots versus temperature.

FIG. 19 is a plot of an example of the confinement of energy of the fundamental mode within the elongated slots versus temperature. In FIG. 19, the confinement of energy of the fundamental mode propagating in the slots decreases with temperature. For a constant confinement, the index of refraction $n_c$ of the composite waveguide would vary with temperature by this confinement multiplied by the index of the refraction $n_p$ of the compensation material within the slot. So, for a confinement of approximately 0.1 and $n_{1p}$=3.5E–4 K$^{-1}$ and assuming a constant confinement, results in an $n_{1c}$=0.1*–3.5E–4=–3.5E–5 K$^{-1}$. This is a bit more than the actual value of –2E–5 K$^{-1}$. This difference is due to the fact that the confinement decreases with temperature as well. This change in the confinement with temperature also causes the desired second order variation of index with temperature, which can be approximated as $n_{2c}$=2*$n_{1p}$*δfraction/δT. In this example the change in the confinement with temperature is –7.5E–4 K$^{-1}$. So, assuming a constant change in the confinement with temperature, we get a significant curvature of 2*–3.5E–4*–7.5E–4=5E–7 K$^{-2}$. This is more than the actual $n_{2c}$ of 1E–7 K$^{-2}$, due to the strong second order variation in the confinement itself. In summary, the origin of the curvature in the index of refraction $n_c$ with temperature can be directly attributed to the change in the fraction of light in the elongated slots with temperature.

Figure 20:
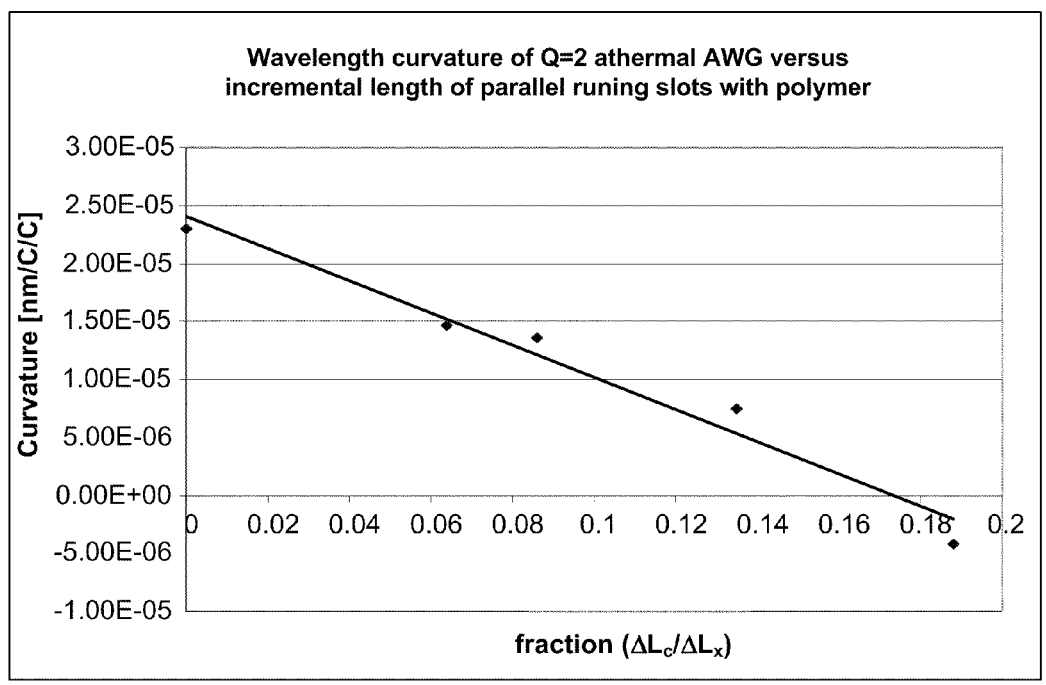
FIG. 20 is a plot of measured center wavelength curvature of AWG devices athermalized as described herein, for various ratios of the operative length increment $\Delta L_c$ of the composite waveguide sections to the total physical length increment $\Delta L_x$ of the waveguides.

FIG. 20 is a plot of center wavelength curvature of AWG devices athermalized as described herein, for various ratios of the operative length increment $\Delta L_c$ of the composite waveguide sections to the total physical length increment $\Delta L_x$ of the waveguides. This ratio is referred to herein as the fraction. As can be seen in FIG. 20, the wavelength curvature (the second order temperature dependency) is largely a linear function of the fraction. As a result, for a given AWG, the wavelength curvature can be minimized by designing the appropriate value for the fraction. The value of the fraction can change from embodiment to embodiment. As shown by (eq. 23) above, changes in the operative length increment $\Delta L_c$ of the composite waveguide sections also effect the wavelength slope (the first order temperature dependency). In embodiments in which the parallel slots described herein are implemented in conjunction with conventional transversely oriented slots within the slab waveguide, the changes in the wavelength slope due to the change in $\Delta L_c$ can be compensated for by adjusting the transversely oriented slots with the slab. This adjustment may include moving the transversely oriented slots up or down along the optical axis in the slab.

Figure 21:
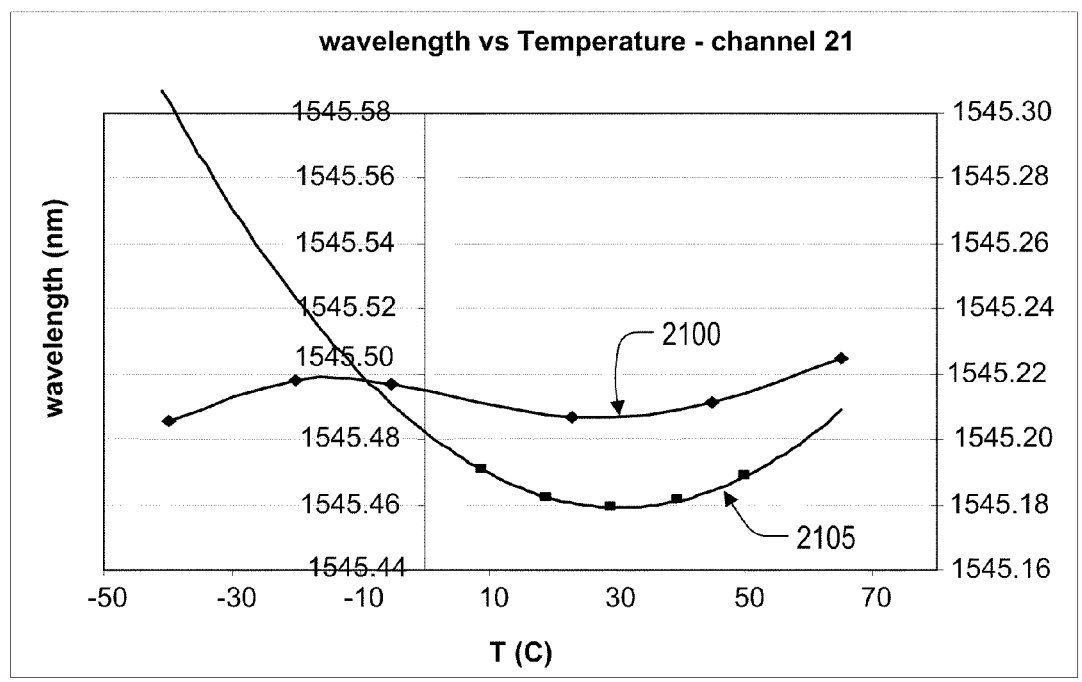
FIG. 21 is a plot of the measured center wavelength dependency of an AWG device which has been athermalized as described herein.

FIG. 21 is a plot of the center wavelength dependency 2100 of an AWG device which has been athermalized as described herein. Also show in FIG. 21 is the measured center wavelength dependency 2105 for a conventional linearly athermalized AWG device. The data in FIG. 21 is measured with the AWG input channel connected to a tunable laser and with AWG output channel 21 (of 4) connected to the detector. As shown in FIG. 21, an AWG athermalized as described herein provides an enormous improvement over conventional linearly athermalized devices. Thus, it can be seen that an AWG device athermalized to the second order as described herein, can achieve either a much larger temperature range, or much more densely packed channels, or both, than can a conventional device.

Figure 22:
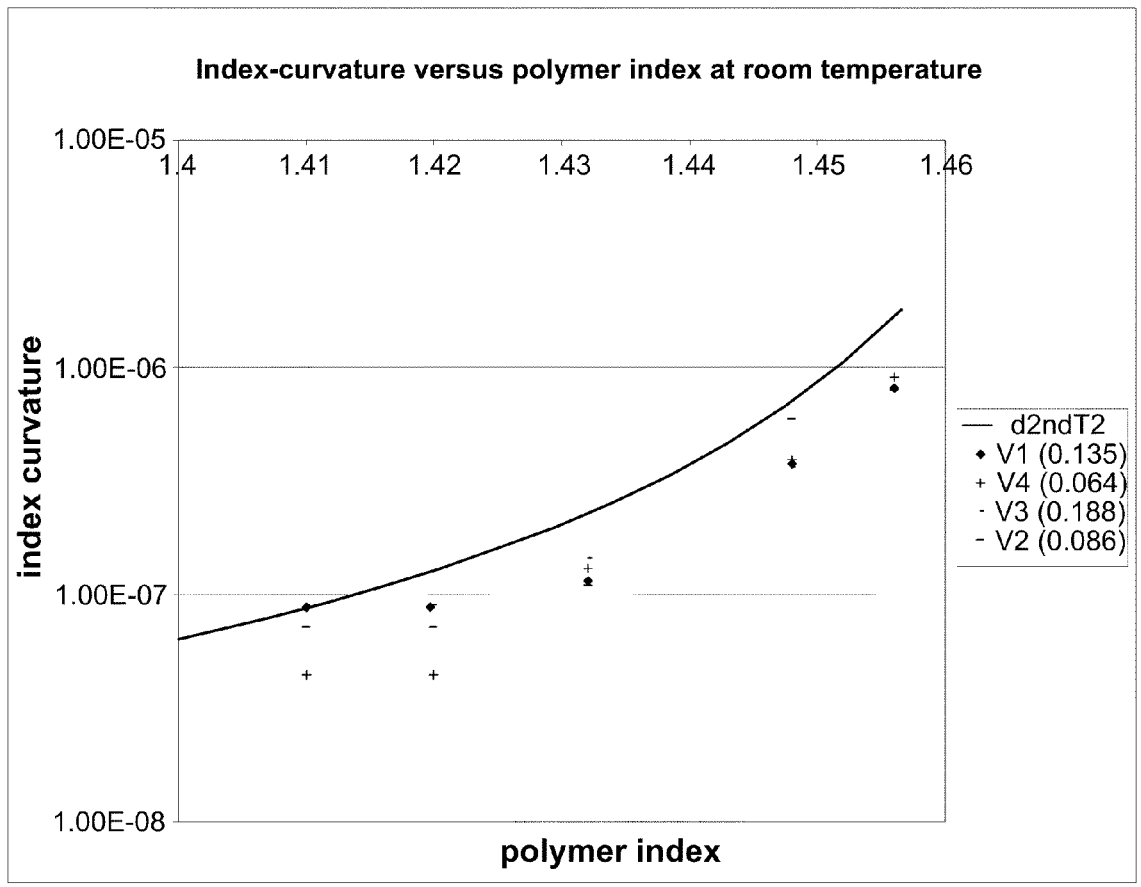
FIG. 22 is a plot of the measured index-curvature versus the polymer index at room temperature, showing that the index-curvature is different for different compensation materials.

As described above, by appropriate design of the size, shape and material(s) for the slots 730, the effective index of refraction $n_c$ of the composite waveguide sections 740 can be designed to satisfy both (eq. 23) and (eq. 24) and achieve second order athermalization. FIG. 22 is a plot of the measured index-curvature versus the polymer index at room temperature, showing that the index-curvature is different for different compensation materials. As can be seen in FIG. 22, a polymer with an index above 1.42 at room temperature results in a strong increase in the index curvature. The high curvature would allow for athermalization with a smaller operative length increment $\Delta L_c$ of the composite waveguide sections.

The generally parallel elongated slots described herein demonstrate how one can change the variation of index-curvature with temperature to provide excellent athermalization. Generally parallel elongated slots may also or alternatively be implemented to change the variation of the net index of the waveguide with wavelength. This could be of relevance for cyclic AWGs where one wants to control the free spectral range (FSR). Another application on the use of generally parallel elongated slots in an AWG is to eliminate, or otherwise control, polarization dependent wavelength. Further applications include to change the variation of birefringence with temperature.

Figure 23:
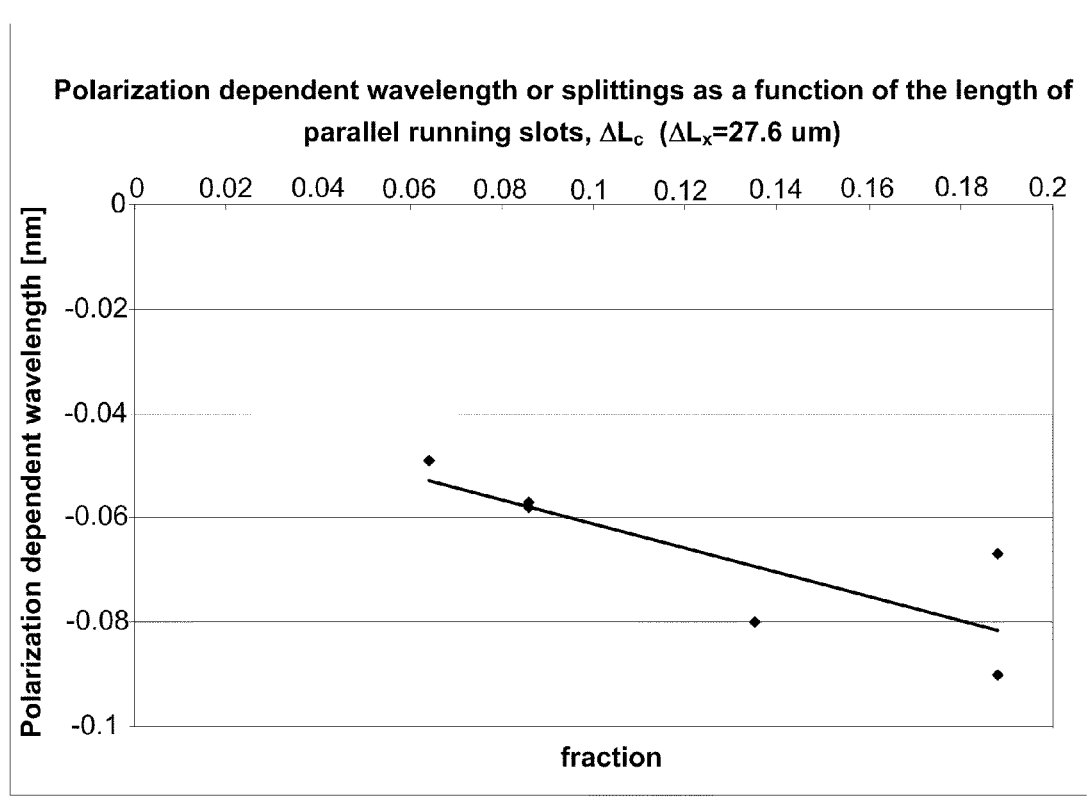
FIG. 23 is a plot of measured data showing the variation in the polarization of an AWG as a function of the operative length increment $\Delta L_c$ of the composite waveguide sections.

FIG. 23 is a plot of measured data showing the variation in the polarization of an AWG as a function of the operative length increment $\Delta L_c$ of the composite waveguide sections. This change in polarization dependent wavelength originates from a change of the light modification as well as a change of the stress in the cross-section of the composite waveguide sections. One can achieve this by using a polymer material in the slots, but also with air.

The above techniques for second order athermalization can be extended to take into account higher order temperature dependencies of the effective indices of refraction, up to any order Q. To do so, the above equations (eq. 14) to (eq. 18) can be generalized by defining:

$$n_c = \sum_{q=0}^{Q} n_{qc} T^q \tag{eq. 25}$$

and $$n_r = \sum_{q=0}^{Q} n_{qr} T^q \tag{eq. 26}$$

where $$n_{qx} = \left. \frac{d^q n_x}{dT} \right|_{T=0} \tag{eq. 27}$$

for $x = c$ and $x = r$.

We can therefore write $$\frac{dn_x}{dT} = \sum_{q=1}^{Q} q n_{qx} T^{(q-1)} \tag{eq. 28}$$

for $x = c$ and $x = r$.

Substituting into (eq. 7) for athermal behavior yields $$\Delta L_c \sum_{q=1}^{Q} q n_{qc} T^{(q-1)} + \Delta L_r \sum_{q=1}^{Q} q n_{qr} T^{(q-1)} = 0 \tag{eq. 29}$$

Rearranging and collecting terms in like orders of T, gives:

$$\sum_{q=1}^{Q} q(\Delta L_c n_{qc} + \Delta L_r n_{qr}) T^{(q-1)} = 0 \tag{eq. 30}$$

This equation is satisfied if $$\Delta L_c n_{qc} + \Delta L_r n_{qr} = 0 \tag{eq. 31}$$

for all q between 1 and Q, inclusive.

Accordingly, in another embodiment, an AWG is constructed in the same manner as shown in FIG. 7, but the composite waveguide sections 740 are designed to satisfy all Q of the requirements of (eq. 31).

The above second order athermalization techniques can be further extended to take into account the temperature dependencies not only of the effective indices of refraction, but also the $\Delta L$'s. In this case, athermal behavior requires $$\frac{dn_c}{dT}\Delta L_c + \frac{dn_r}{dT}\Delta L_r + n_c\alpha\Delta L_c T + n_r\alpha\Delta L_r T = 0 \qquad \text{(eq. 32)}$$

with $\alpha$ being the mechanical thermal expansion coefficient of the chip. However, since $\Delta L_c$ is much smaller than $\Delta L_r$ in a typical embodiment, the mechanical expansion term can be lumped into $n_{1r}$ without much loss of accuracy. Furthermore, if $n_{1r}$ is determined empirically, than the value of $n_{1r}$ will inherently include contributions from the mechanical expansion term. Preferably, the empirical determination is made using data taken from a chip already packaged in the same manner as would the final product, so that if the packaging of the final product will influence the mechanical expansion exhibited by the chip, those influences are present also in the chip as tested. Alternatively, the empirical determination can be made using data taken from an unpackaged chip, and a compliant layer separates the chip from the packaging in the final product.

Additional accuracy can be obtained by lumping the mechanical expansion terms in appropriate proportions into both the first and second order index terms as follows:

$$n_{1c} = n'_{1c} + n_{0c}\alpha \qquad \text{(eq. 33)}$$

$$n_{2c} = n'_{2c} + n_{1c}\alpha \qquad \text{(eq. 34)}$$

$$n_{1r} = n'_{1r} + n_{0r}\alpha \qquad \text{(eq. 33)}$$

$$n_{2r} = n'_{2r} + n_{1r}\alpha \qquad \text{(eq. 34)}$$

This is easily generalized to higher order polynomials.

In a real device making use of the concepts described herein, it will be appreciated that it may be either impossible or commercially unnecessary to match the equations set forth above exactly. For example, the devices may deviate from the equations due to ordinary manufacturing tolerances. A real device which deviates from the equations set forth above for any of these reasons, is considered herein to satisfy the equations "substantially." Since such devices still make use of the novel concepts taught herein they can be made with much better accuracy than conventional devices, even though they do not satisfy the equations exactly.

In addition, whereas athermality can be optimized by using the equations and techniques described herein, it will be possible that an embodiment can still make great improvements in athermality over conventional methods if the equations described herein are only substantially equal to zero, or with a small spoiling factor. As used herein, the phrase "substantially equal to zero" is intended to accommodate manufacturing tolerances. It is also intended to accommodate implementations where the result is a small number that yields an AWG having much better athermality than possible using conventional methods. It is not essential that the equations exactly zero to obtain the benefits of the invention.

Whereas conventional linear athermalization techniques likely cannot produce an AWG having a center wavelength variation less than about 70 pm over the temperature range −50 C to +90 C, or a center wavelength variation less than about 20 pm over the temperature range 0 C to +70 C, the techniques described herein might reduce the center wavelength variation to less than about 40 pm over the temperature range −50 C to +90 C, or to less than about 10 pm over the temperature range 0 C to +70 C.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An arrayed waveguide apparatus comprising a plurality of waveguides from an input free-space region to an output free-space region, each waveguide in the plurality comprising:
   a core material;
   a cladding material; and
   a compensation material within a slot elongated in a direction parallel to the core material, the slot being parallel to a segment of the core material, the compensation material having an effective index of refraction temperature dependency which differs from that of the core and cladding materials.

2. The apparatus of claim 1, wherein:
   each waveguide in the plurality has a respective optical path length between an input boundary of the input free-space region and an output boundary of the output free-space region which differs from that of an adjacent waveguide in the plurality by a respective effective optical path length difference; and
   at least the first and second order derivatives with respect to temperature for each of the optical path length differences are substantially equal to zero throughout a temperature range of −5 degrees Celsius to +70 degrees Celsius.

3. The apparatus of claim 2, wherein:
   at least the first and second order derivatives with respect to temperature for each of the optical path length differences are substantially equal to zero throughout a temperature range of −30 degrees Celsius to +70 degrees Celsius.

4. The apparatus of claim 1, wherein for each waveguide in the plurality:
the core material has a physical path length between an input boundary of the input free-space region and an output boundary of the output free-space region which differs from that of the core material of an adjacent waveguide in the plurality by a first path length difference; and
the compensation material has an operative path length in the direction parallel to the core material and which differs from that of the compensation material of an adjacent waveguide in the plurality by a second path length difference.

5. The apparatus of claim 4, wherein each waveguide in the plurality includes:
a first slot on a first side of the segment of the core material and containing the compensation material; and
a second slot on a second side of the segment of the core material and containing the compensation material.

6. The apparatus of claim 4, wherein a ratio of the first path length difference to the second path length difference is substantially the same for each waveguide in the plurality.

7. The apparatus of claim 1, wherein the slot for each waveguide in the plurality is discontiguous from the slots of each of the other waveguides.

8. The apparatus of claim 1, wherein each waveguide in the plurality further includes a second compensation material in a second slot elongated in a direction parallel to a second segment of the core material, the second compensation material having an effective index of refraction temperature dependency which differs from that of the core, cladding and compensation materials.

9. The apparatus of claim 1, further comprising a second compensation material within at least one of the input free-space region and the output free-space region, the second compensation material having an effective index of refraction temperature dependency which differs from that of the core and cladding materials.

10. The apparatus of claim 9, wherein the compensation material and the second compensation material are the same.

11. A method for manufacturing an arrayed waveguide apparatus comprising forming a plurality of waveguides from an input free-space region to an output free-space region, forming each waveguide in the plurality comprising:
forming a core material;
forming a cladding material; and
forming a compensation material within a slot elongated in a direction parallel to the core material, the slot being parallel to a segment of the core material, the compensation material having an effective index of refraction temperature dependency which differs from that of the core and cladding materials.

12. The method of claim 11, wherein:
each waveguide in the plurality has a respective optical path length between an input boundary of the input free-space region and an output boundary of the output free-space region which differs from that of an adjacent waveguide in the plurality by a respective effective optical path length difference; and
at least the first and second order derivatives with respect to temperature for each of the optical path length differences are substantially equal to zero throughout a temperature range of −5 degrees Celsius to +70 degrees Celsius.

13. The method of claim 12, wherein:
at least the first and second order derivatives with respect to temperature for each of the optical path length differences are substantially equal to zero throughout a temperature range of −30 degrees Celsius to +70 degrees Celsius.

14. The method of claim 11, wherein for each waveguide in the plurality:
the core material has a physical path length between an input boundary of the input free-space region and an output boundary of the output free-space region which differs from that of the core material of an adjacent waveguide in the plurality by a first path length difference; and
the compensation material has an operative path length in the direction parallel to the core material and which differs from that of the compensation material of an adjacent waveguide in the plurality by a second path length difference.

15. The method of claim 14, wherein forming each waveguide in the plurality includes:
forming a first slot on a first side of the segment of the core material and containing the compensation material; and
forming a second slot on a second side of the segment of the core material and containing the compensation material.

16. The method of claim 14, wherein a ratio of the first path length difference to the second path length difference is substantially the same for each waveguide in the plurality.

17. The method of claim 11, wherein the slot for each waveguide in the plurality is discontiguous from the slots of each of the other waveguides.

18. The method of claim 11, wherein forming each waveguide in the plurality further includes forming a second compensation material in a second slot elongated in a direction parallel to a second segment of the core material, the second compensation material having an effective index of refraction temperature dependency which differs from that of the core, cladding and compensation materials.

19. The method of claim 11, further comprising forming a second compensation material within at least one of the input free-space region and the output free-space region, the second compensation material having an effective index of refraction temperature dependency which differs from that of the core and cladding materials.

20. The method of claim 19, wherein the compensation material and the second compensation material are the same.

21. An arrayed waveguide apparatus comprising a plurality of waveguides from an input free-space region to an output free-space region,
each waveguide in the plurality comprising:
core and cladding materials which confine optical energy in at least one dimension orthogonal to a direction of propagation of the optical energy; and
a composite waveguide section which maintains confinement of the optical energy in the at least the one dimension;
wherein each waveguide in the plurality has a respective optical path length between an input boundary of the input free-space region and an output boundary of the output free-space region which differs from that of an adjacent waveguide in the plurality by a respective effective optical path length difference; and
at least the first and second order derivatives with respect to temperature for each of the optical path length differences are substantially equal to zero throughout a temperature range of −5 degrees Celsius to +70 degrees Celsius.

22. The apparatus of claim 21, wherein:
at least the first and second order derivatives with respect to temperature for each of the optical path length differences, are substantially equal to zero throughout a temperature range of −30 degrees Celsius to +70 degrees Celsius.

23. The apparatus of claim 21, wherein the composite waveguide section comprises a compensation material proximate the core material, the compensation material having an effective index of refraction temperature dependency which differs from that of the core and cladding materials.

24. The apparatus of claim 23, wherein the compensation material for each waveguide in the plurality is discontiguous from the slots of each of the other waveguides.

25. The apparatus of claim 23, wherein each waveguide in the plurality further includes a second composite waveguide section, the second composite waveguide section comprising a second compensation material proximate the core material, the second compensation material having an effective index of refraction temperature dependency which differs from that of the core, cladding and compensation materials.

26. The apparatus of claim 25, wherein for each waveguide in the plurality:
 the core material has a physical path length between the input boundary of the input free-space region and the output boundary of the output free-space region which differs from that of the core material of an adjacent waveguide in the plurality by a first path length difference; and
 the compensation material has an operative path length in a direction parallel to the core material and which differs from that of the compensation material of an adjacent waveguide in the plurality by a second path length difference.

27. The apparatus of claim 26, wherein a ratio of the first path length difference to the second path length difference is substantially the same for each waveguide in the plurality.

28. The apparatus of claim 23, further comprising a second compensation material within at least one of the input free-space region and the output free-space region, the second compensation material having an effective index of refraction temperature dependency which differs from that of the core and cladding materials.

29. The apparatus of claim 28, wherein the compensation material and the second compensation material are the same.

30. The apparatus of claim 21, wherein each waveguide in the plurality includes:
 a first slot on a first side of the core material within the composite waveguide section and containing a compensation material, the compensation material having an effective index of refraction temperature dependency which differs from that of the core and cladding materials; and
 a second slot on a second side of the core material within the composite waveguide section and containing the compensation material.

* * * * *